United States Patent
Johri et al.

(10) Patent No.: US 10,114,691 B2
(45) Date of Patent: Oct. 30, 2018

(54) INFORMATION STORAGE SYSTEM

(71) Applicant: HITACHI, LTD., Tokyo (JP)

(72) Inventors: Abhishek Johri, Tokyo (JP); Takahito Sato, Tokyo (JP); Hideo Saito, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 120 days.

(21) Appl. No.: 15/121,523

(22) PCT Filed: Apr. 21, 2014

(86) PCT No.: PCT/JP2014/002246
§ 371 (c)(1),
(2) Date: Aug. 25, 2016

(87) PCT Pub. No.: WO2015/162634
PCT Pub. Date: Oct. 29, 2015

(65) Prior Publication Data
US 2016/0364287 A1    Dec. 15, 2016

(51) Int. Cl.
*G06F 11/00* (2006.01)
*G06F 11/07* (2006.01)
*G06F 3/06* (2006.01)

(52) U.S. Cl.
CPC .......... *G06F 11/0793* (2013.01); *G06F 3/067* (2013.01); *G06F 3/0617* (2013.01); *G06F 3/0634* (2013.01); *G06F 3/0635* (2013.01); *G06F 3/0659* (2013.01); *G06F 3/0683* (2013.01); *G06F 3/0689* (2013.01); *G06F 11/079* (2013.01); *G06F 11/0727* (2013.01); *G06F 11/0751* (2013.01)

(58) Field of Classification Search
CPC .... G06F 3/0617; G06F 3/0634; G06F 3/0635; G06F 3/0659; G06F 3/067; G06F 3/0683; G06F 3/0689; G06F 11/0727; G06F 11/0751; G06F 11/079; G06F 11/0793
See application file for complete search history.

(56) References Cited

U.S. PATENT DOCUMENTS 5,812,748 A    9/1998  Ohran et al.
7,478,263 B1   1/2009  Kownacki et al.
(Continued)

FOREIGN PATENT DOCUMENTS

EP    1344133 B1    11/2008
JP    2008-530658 A  8/2008
(Continued)

*Primary Examiner* — Joshua P Lottich
(74) *Attorney, Agent, or Firm* — Volpe and Koenig, P.C.

(57) ABSTRACT

Provided is an information storage system including a first storage apparatus configured to provide a first logical volume, a second storage apparatus configured to provide a second logical volume, and a quorum accessed from the first storage apparatus and the second storage apparatus and including information regarding states of the first storage apparatus and the second storage apparatus. The second storage apparatus is configured to, after detecting communication failure with the quorum, halt use of the quorum and check communication with the first storage apparatus for failure before responding to the host for each of read and write commands sent from the host.

7 Claims, 28 Drawing Sheets

(56) References Cited

U.S. PATENT DOCUMENTS

| | | | |
|---|---|---|---|
| 8,060,777 B2 | 11/2011 | Ninose | |
| 8,423,822 B2 | 4/2013 | Sato | |
| 9,769,259 B2 * | 9/2017 | Jibbe | H04L 67/1095 |
| 9,875,059 B2 * | 1/2018 | Nasu | G06F 3/0647 |
| 2006/0179061 A1 | 8/2006 | D'Souza et al. | |
| 2008/0104346 A1 * | 5/2008 | Watanabe | G06F 11/2069 |
| | | | 711/162 |
| 2008/0104443 A1 * | 5/2008 | Akutsu | G06F 11/2058 |
| | | | 714/6.12 |
| 2010/0058021 A1 * | 3/2010 | Kawamura | G06F 3/0608 |
| | | | 711/171 |
| 2011/0179188 A1 | 7/2011 | Nakagawa et al. | |
| 2013/0080723 A1 * | 3/2013 | Sawa | G06F 3/0607 |
| | | | 711/162 |
| 2013/0282979 A1 * | 10/2013 | Suzuki | G06F 3/061 |
| | | | 711/114 |
| 2013/0318297 A1 * | 11/2013 | Jibbe | G06F 3/061 |
| | | | 711/114 |
| 2014/0108754 A1 * | 4/2014 | Kawaguchi | G06F 3/0617 |
| | | | 711/162 |
| 2015/0169415 A1 * | 6/2015 | Hildebrand | G06F 11/201 |
| | | | 714/4.5 |
| 2015/0227318 A1 * | 8/2015 | Banka | G06F 3/0617 |
| | | | 709/202 |

FOREIGN PATENT DOCUMENTS

| | | |
|---|---|---|
| JP | 2008-299369 A | 12/2008 |
| JP | 2012-531654 A | 12/2012 |

* cited by examiner

[Fig. 1]
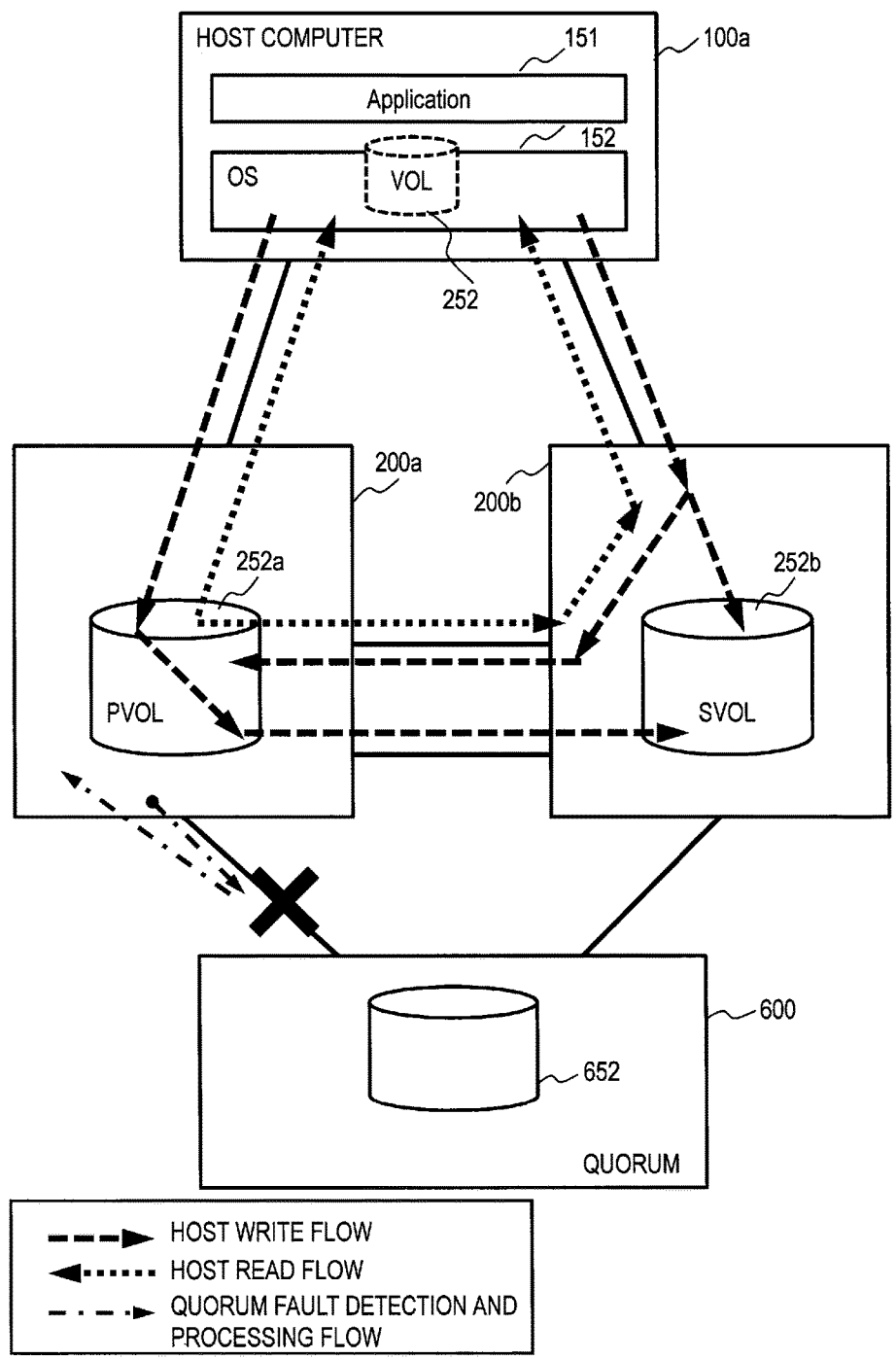

[Fig. 2]
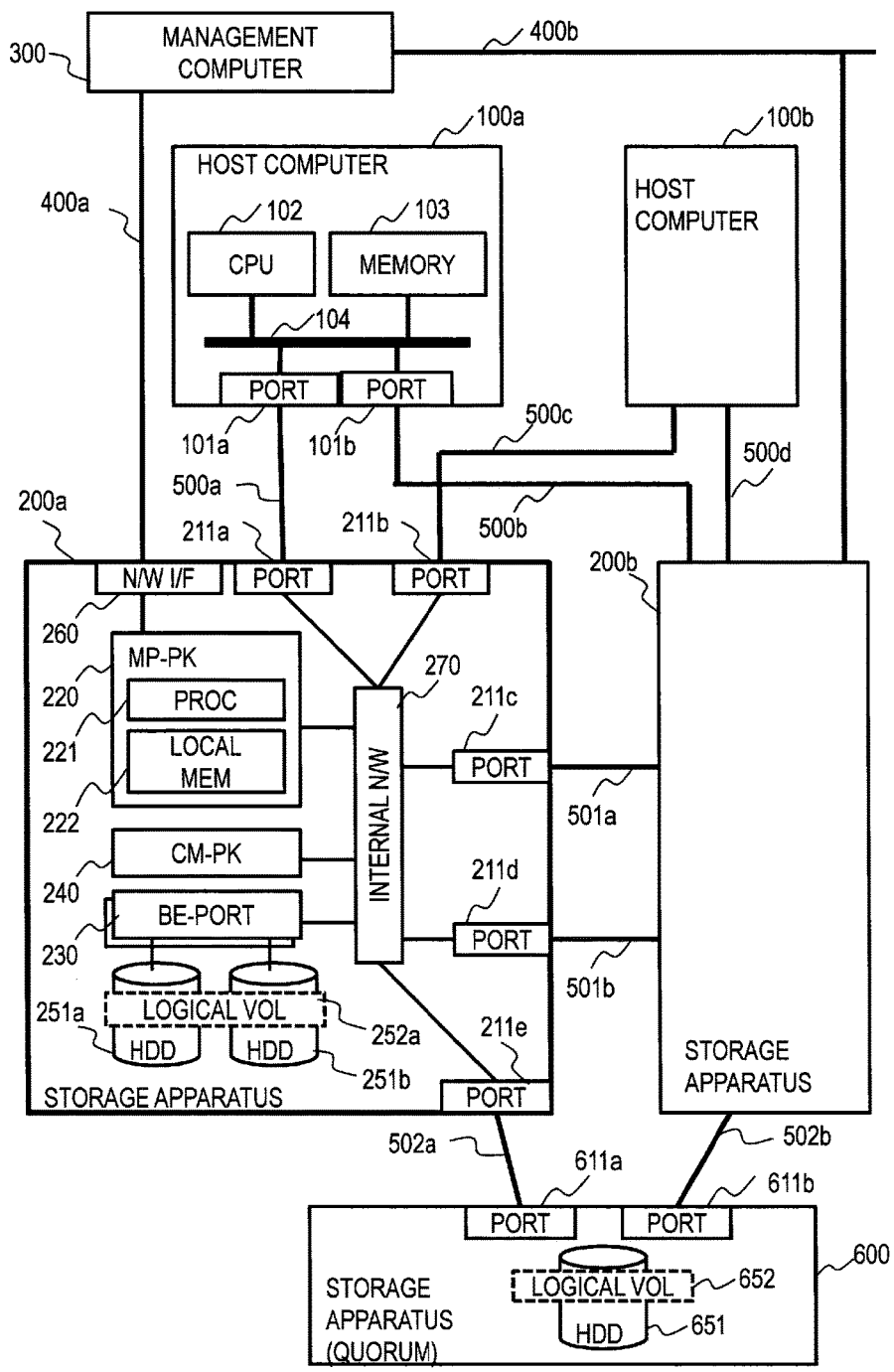

[Fig. 3]
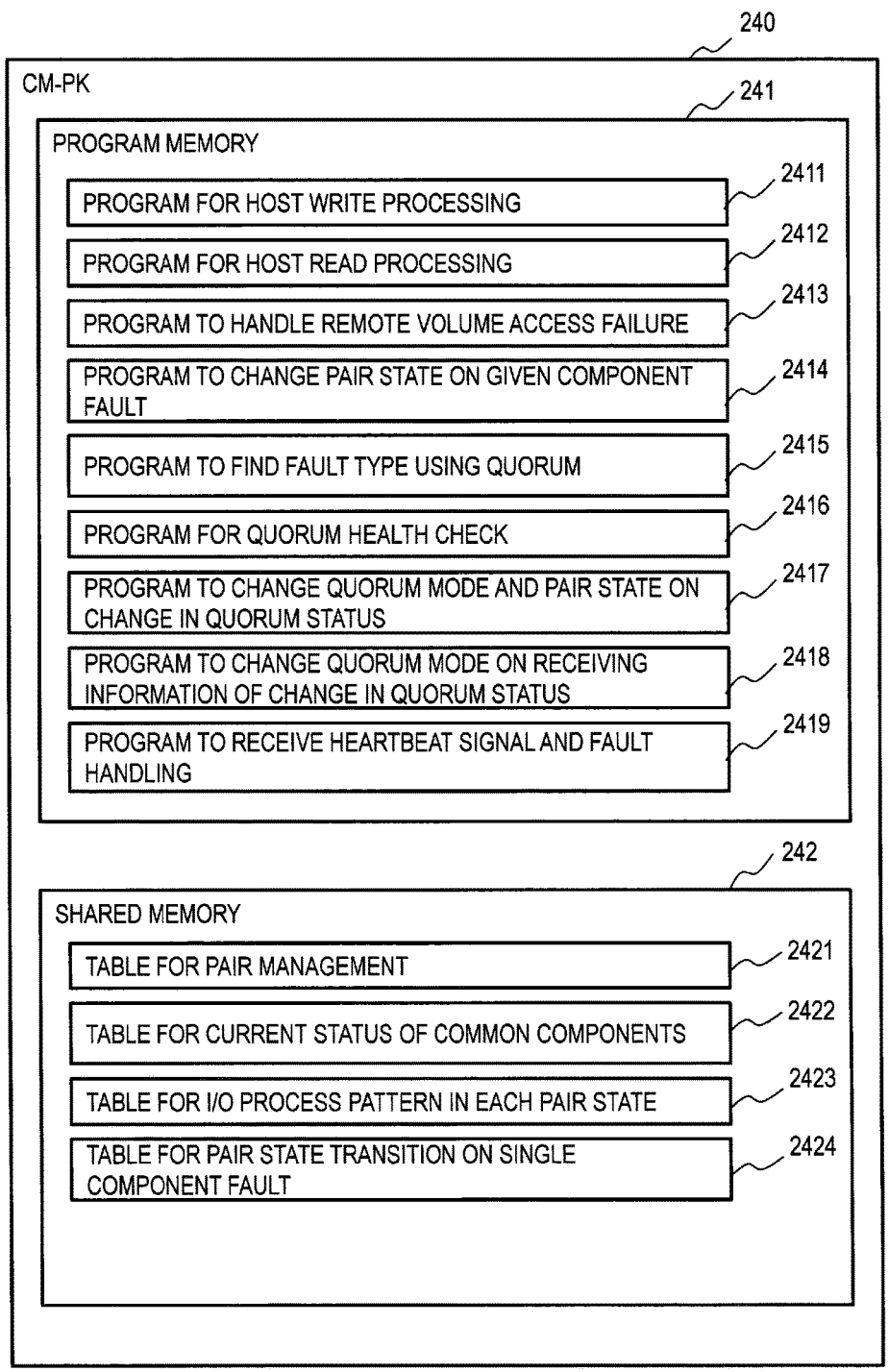

[Fig. 4]
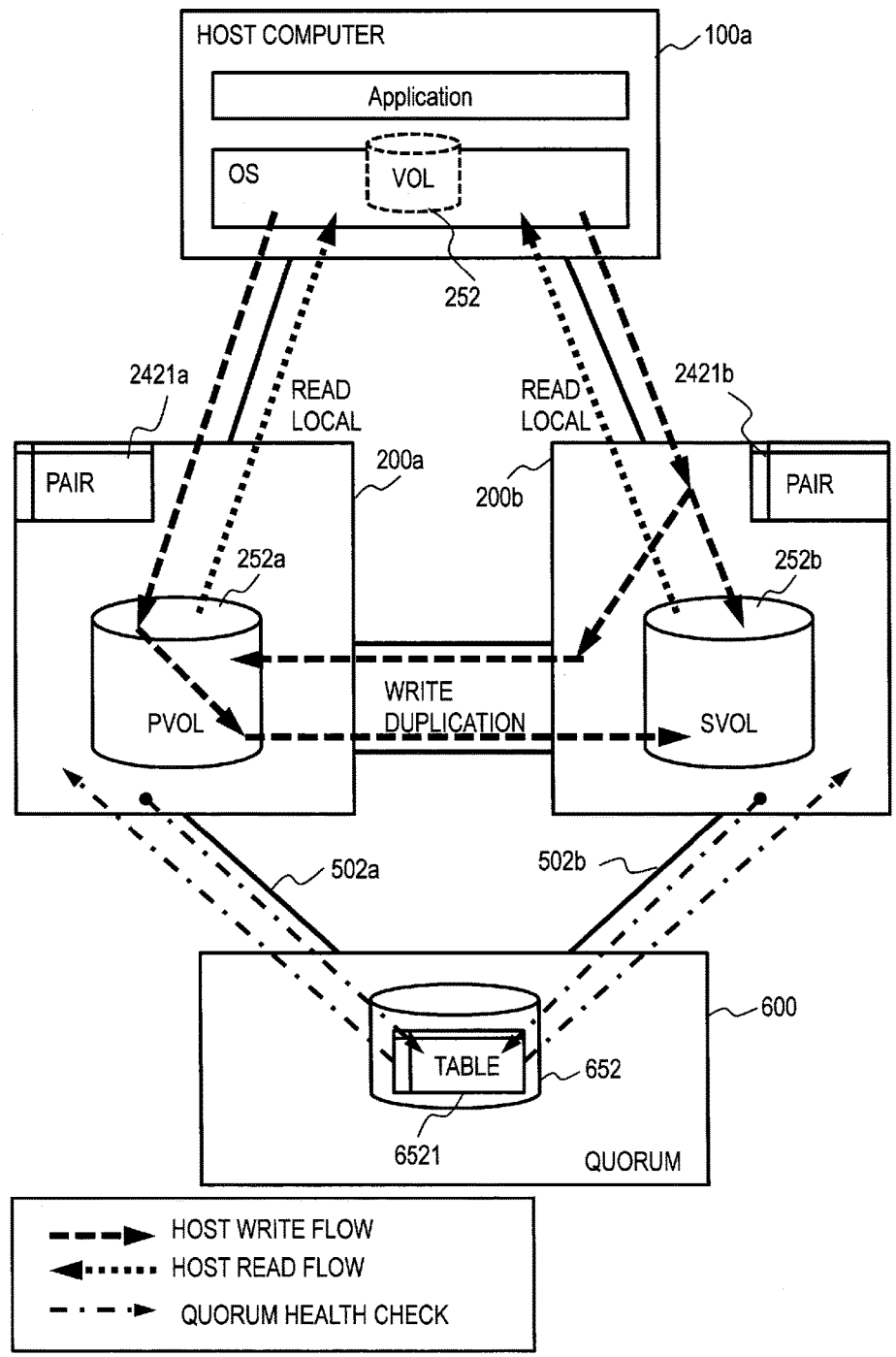

[Fig. 5A]
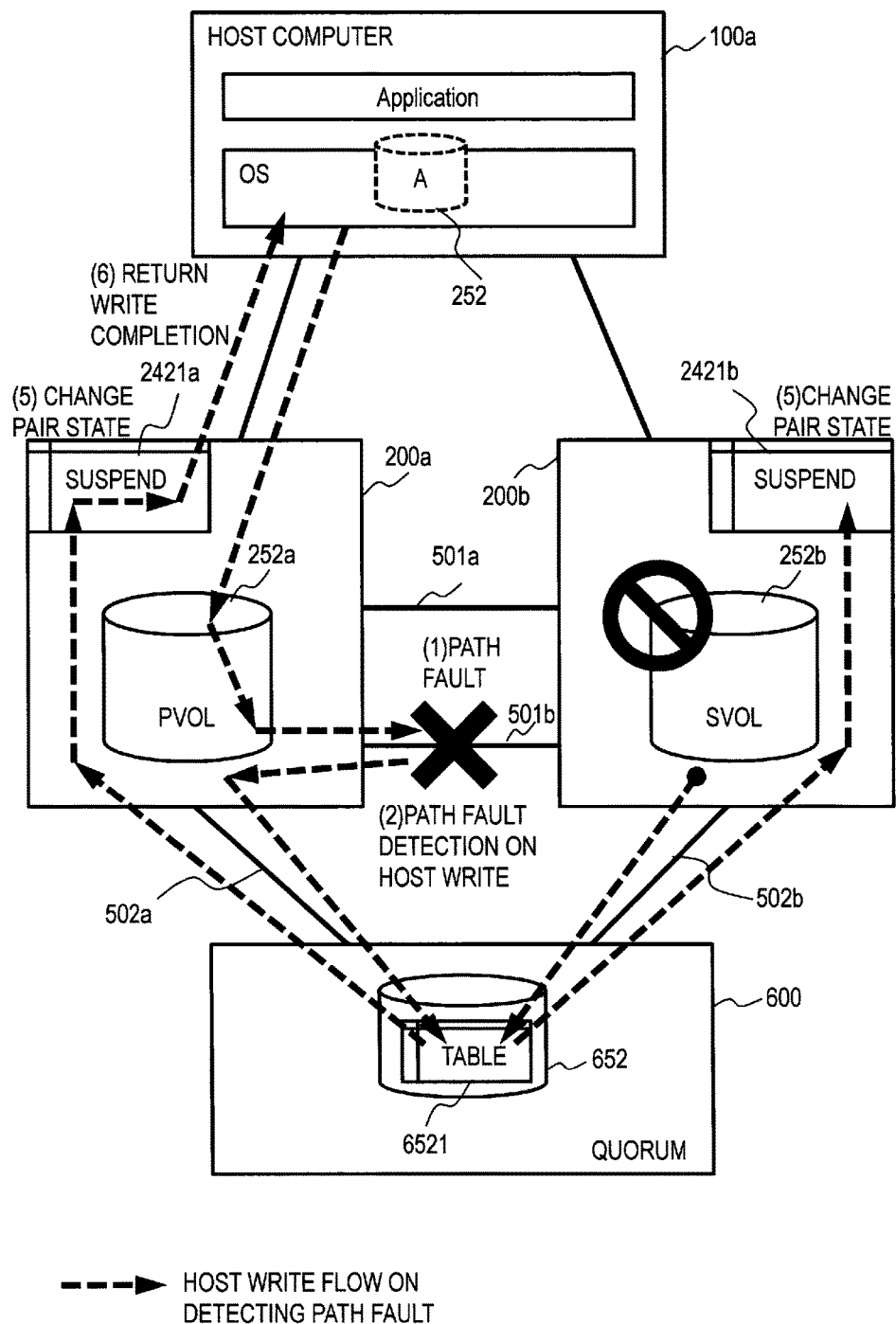

[Fig. 5B]
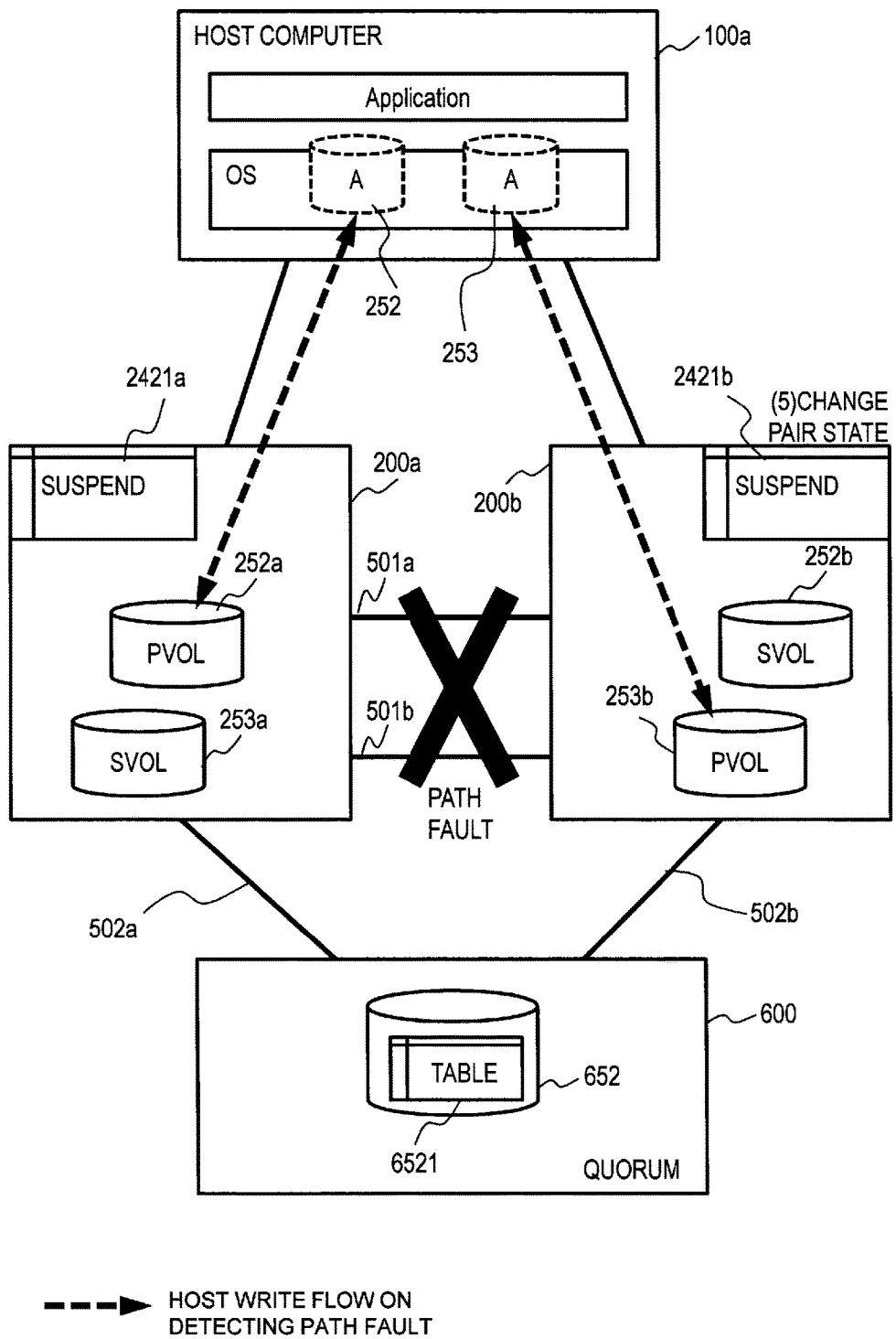

[Fig. 6]
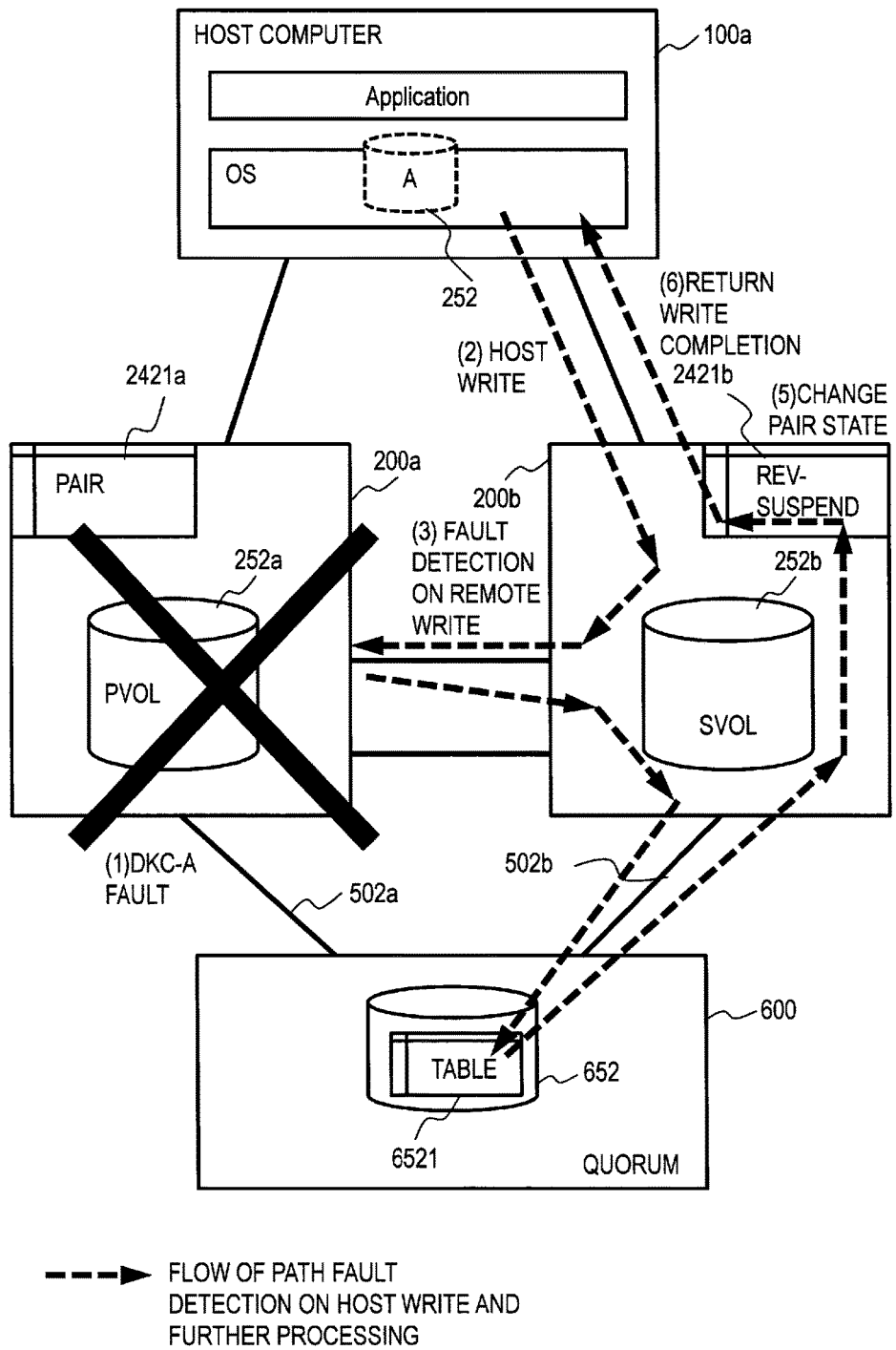

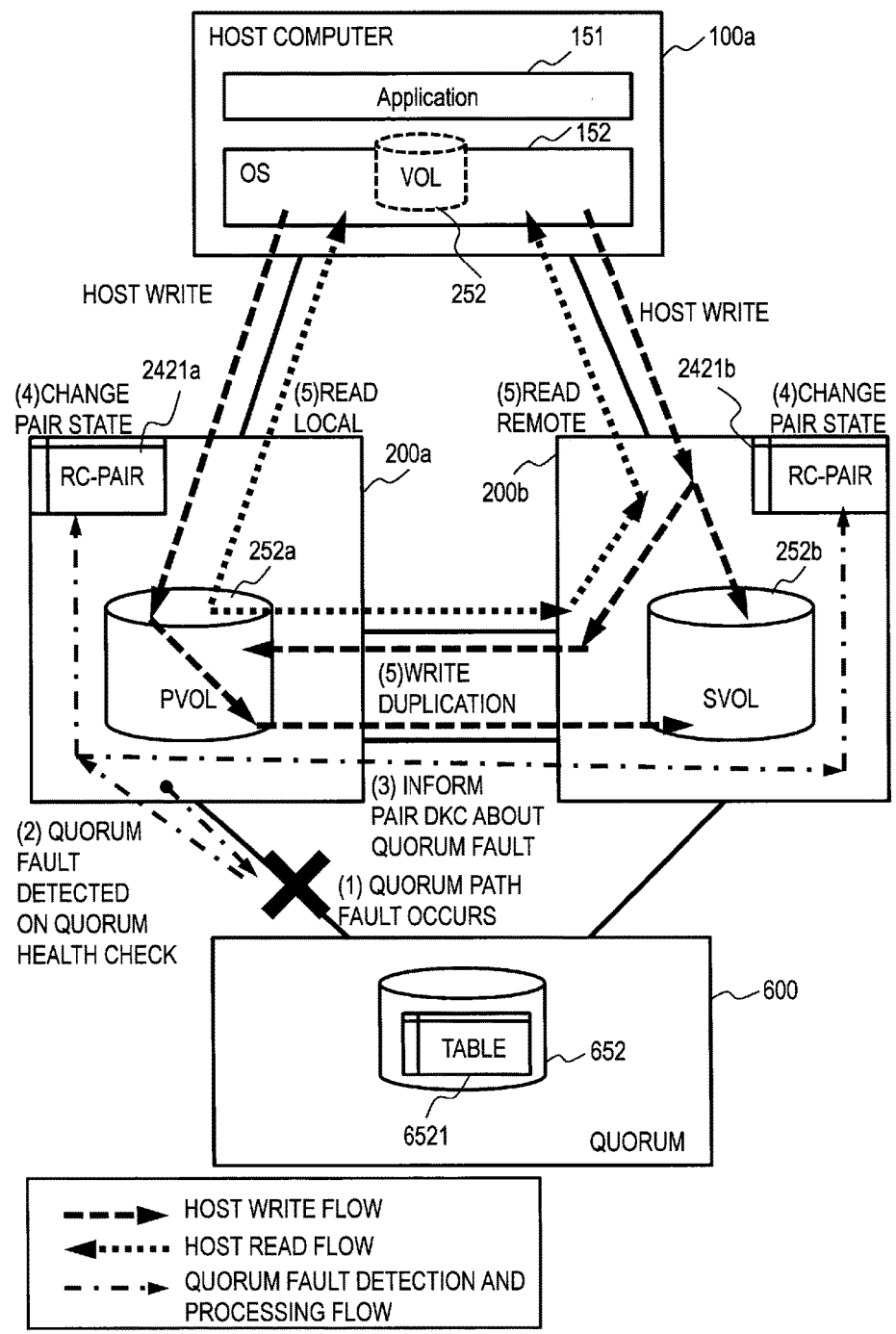

[Fig. 8]
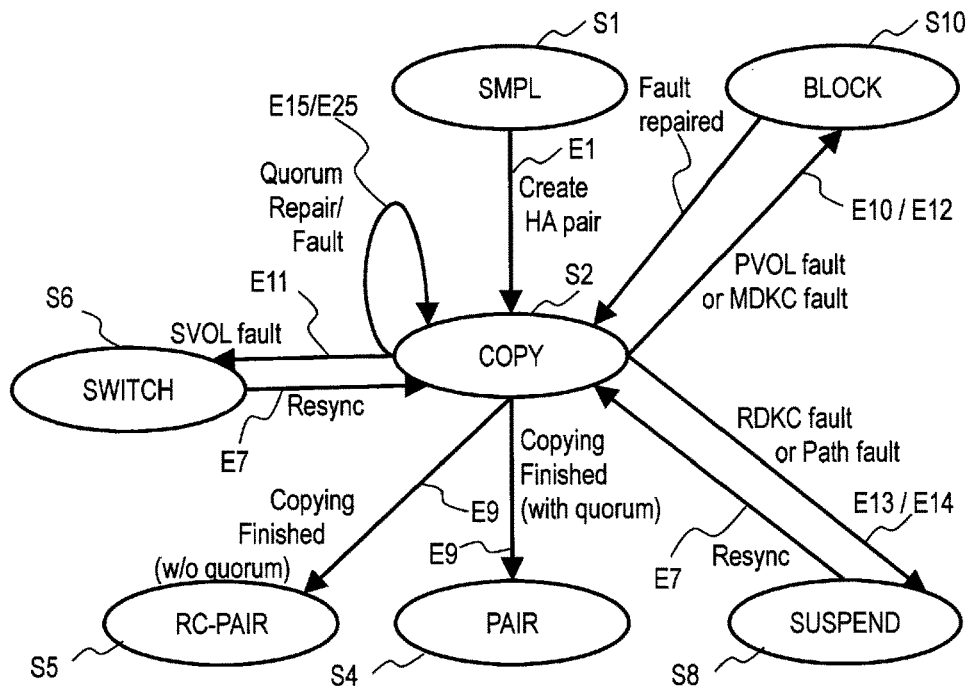
[Fig. 9]
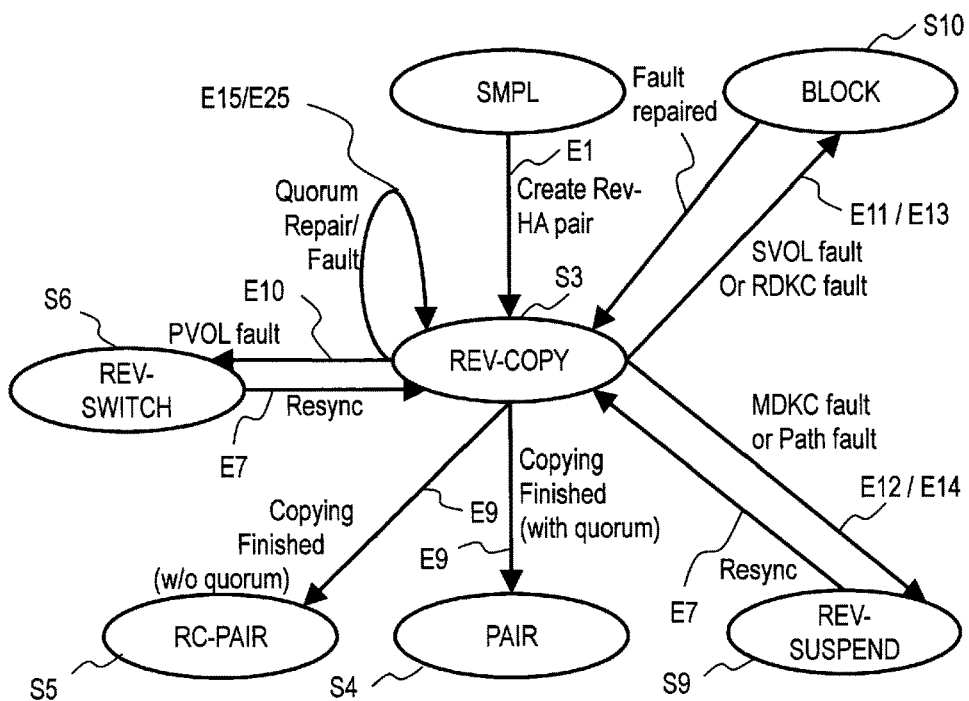

[Fig. 10]
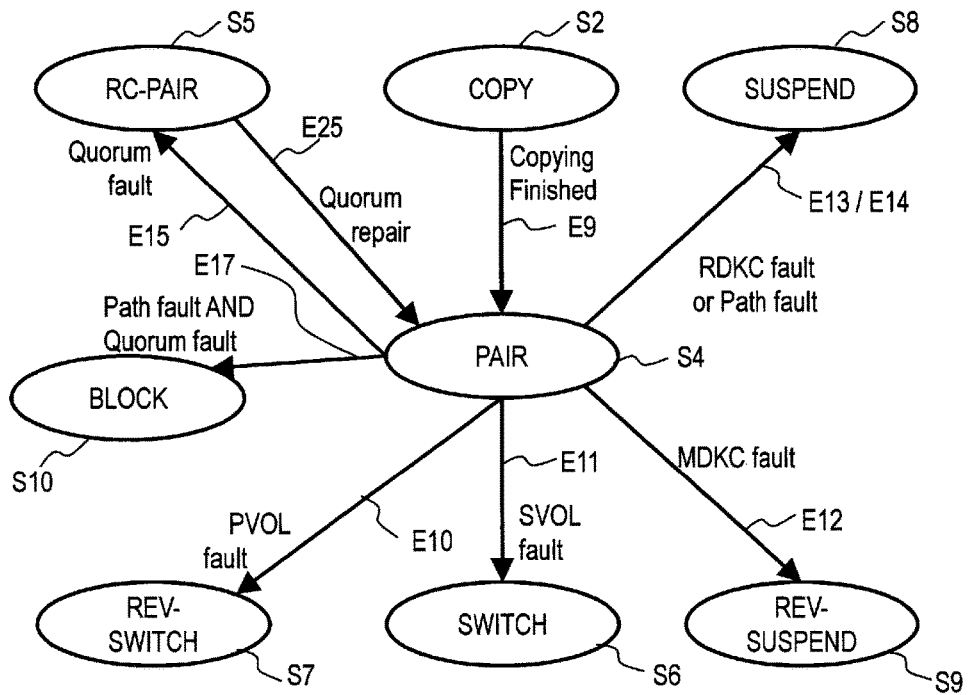
[Fig. 11]
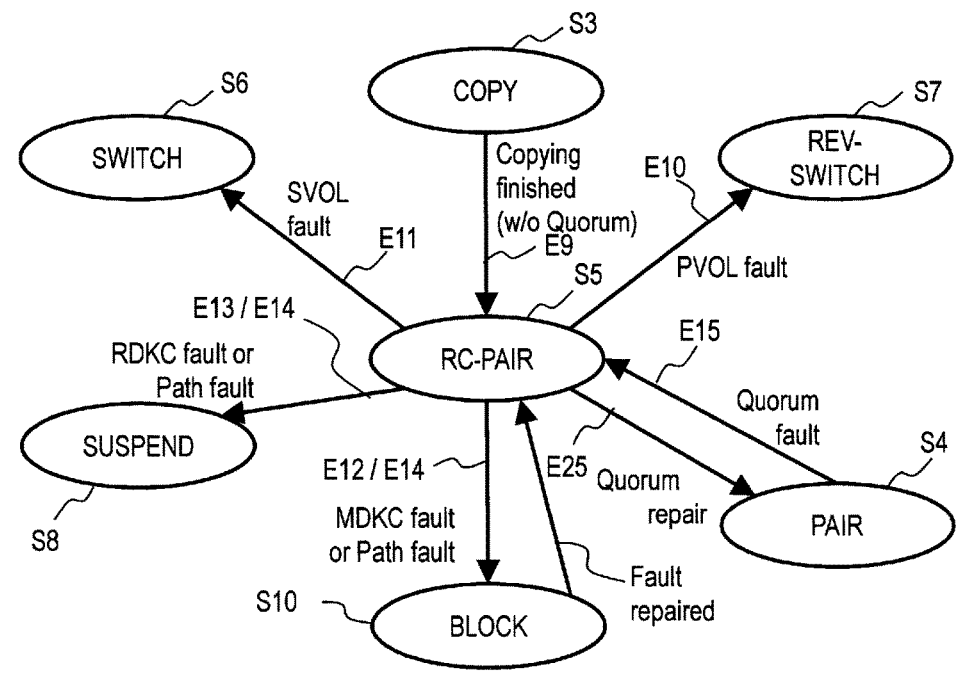

[Fig. 12]
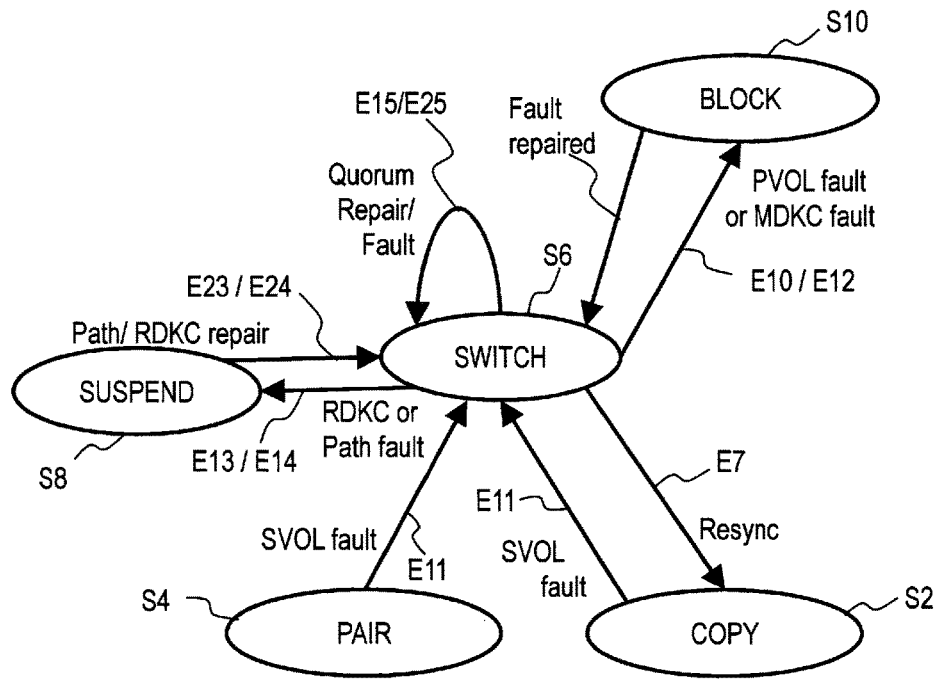
[Fig. 13]
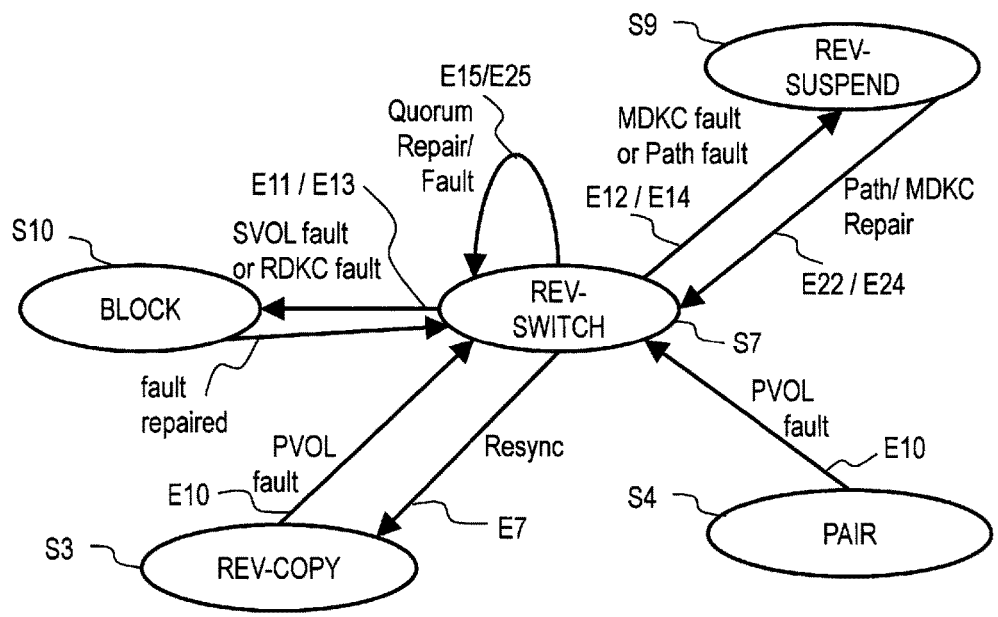

[Fig. 14]
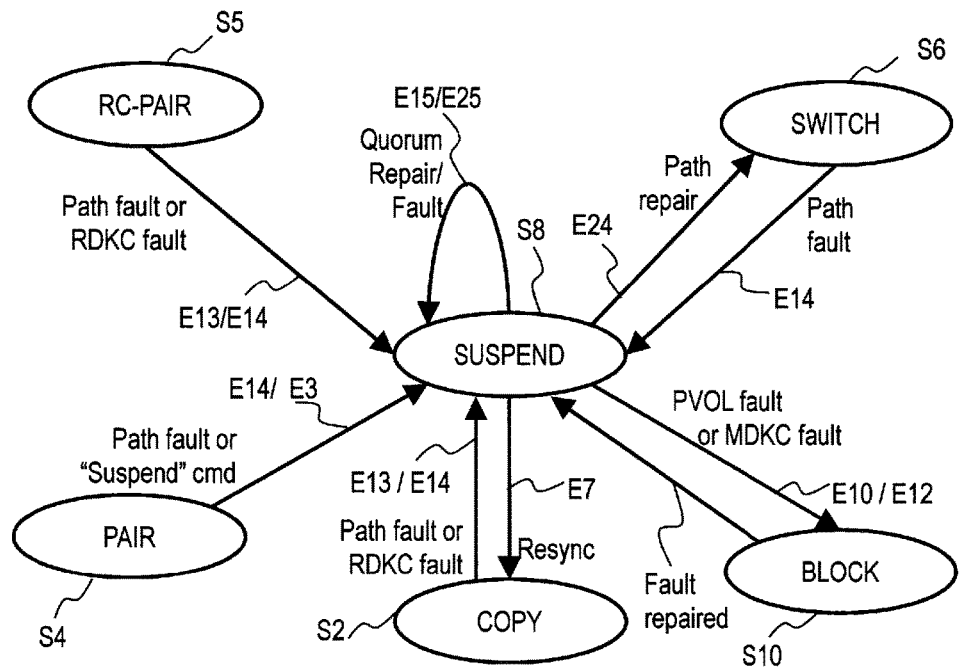
[Fig. 15]
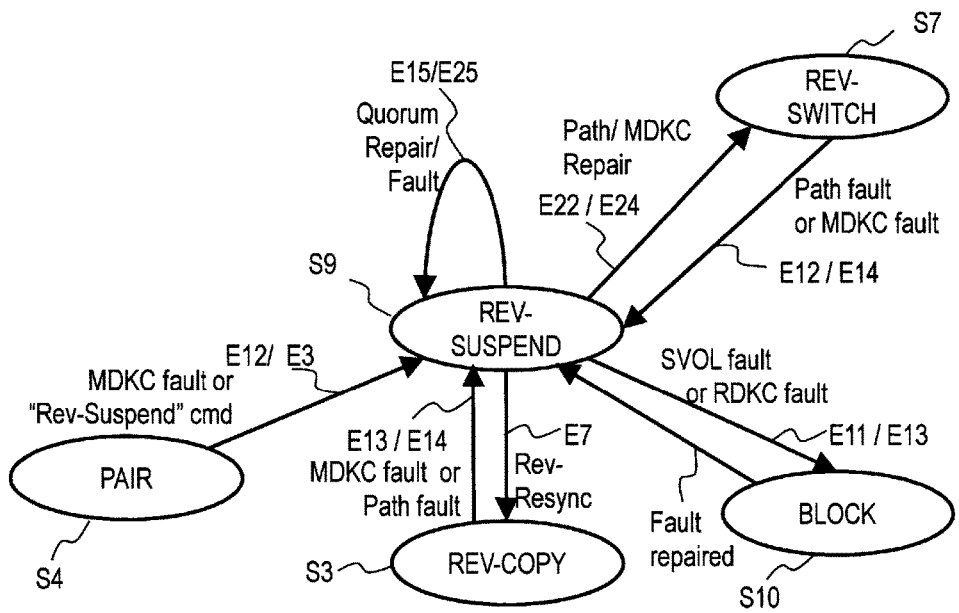

[Fig. 16]
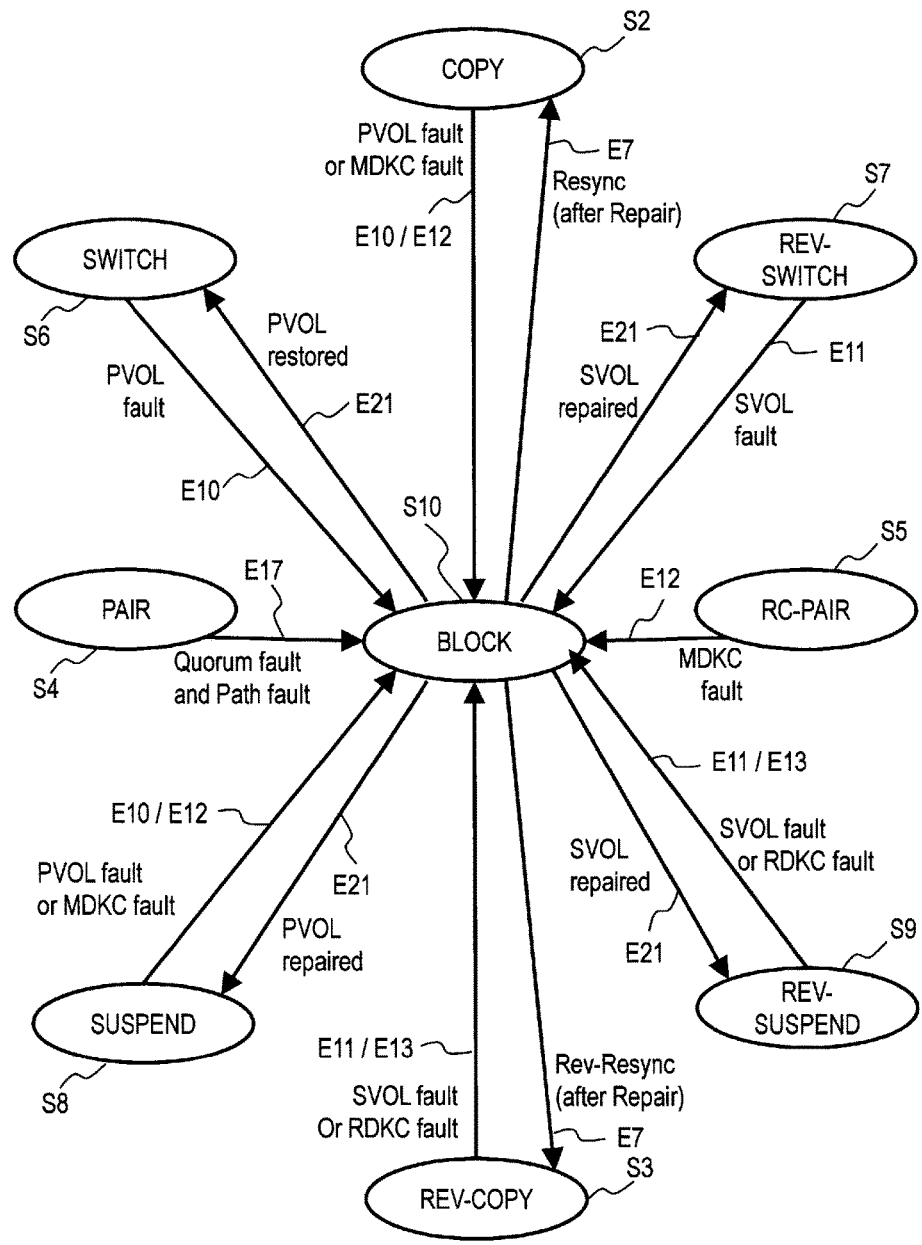

| TABLE FOR QUORUM LOCK MANAGEMENT ||||
|---|---|---|---|
| Priority DKC ID | TEMP LOCK || FIX LOCK (WINNER DKC) |
| | DKC ID: D2 | DKC ID: D5 | |
| D2 | TRUE | FALSE | D2 |
| D5 | TRUE | FALSE | D2 |

| TABLE FOR PAIR MANAGEMENT ||||||||
|---|---|---|---|---|---|---|---|
| HA Pair ID | OWN VOL ID | OWN VOL TYPE | OWN VOL STATUS | PAIR DKC ID | PAIR VOL ID | PAIR VOL STATUS | PAIR STATE |
| 1 | V2 | PVOL | GOOD | D5 | V7 | GOOD | RC-PAIR |
| 2 | V4 | SVOL | FAULT | D5 | V8 | GOOD | SWITCH |
| ... | ... | ... | ... | ... | ... | ... | ... |

| TABLE FOR CURRENT STATUS OF COMMON COMPONENTS ||||||
|---|---|---|---|---|---|
| OWN DKC (ID: D2) | PAIR DKC (ID: D5) | INTER DKC PATH (ID: P2) | OWN QUORUM (ID: Q4) | PAIR DKC'S QUORUM | QUORUM MODE |
| GOOD | GOOD | GOOD | FAULT | GOOD | UNAVAILABLE |

| TABLE FOR I/O PROCESS PATTERN IN EACH PAIR STATE | | | | |
|---|---|---|---|---|
| PAIR STATE | PVOL | | SVOL | |
| | HOST READ | HOST WRITE | HOST READ | HOST WRITE |
| SMPL | LOCAL | LOCAL | LOCAL | LOCAL |
| COPY | LOCAL | DUPLICATE | REMOTE | DUPLICATE |
| REV-COPY | REMOTE | DUPLICATE | LOCAL | DUPLICATE |
| PAIR | LOCAL | DUPLICATE | LOCAL | DUPLICATE |
| RC-PAIR | LOCAL | DUPLICATE | REMOTE | DUPLICATE |
| SWITCH | LOCAL | LOCAL | REMOTE | REMOTE |
| REV-SWITCH | REMOTE | REMOTE | LOCAL | LOCAL |
| SUSPEND | LOCAL | LOCAL | NO | NO |
| REV-SUSPEND | NO | NO | LOCAL | LOCAL |
| BLOCK | NO | NO | NO | NO |

[Fig. 21]

TABLE FOR PAIR STATE TRANSITION ON SINGLE COMPONENT FAULT — 2424

| Pair State | Component fault ||||||
|---|---|---|---|---|---|---|
| | MDKC FAULT | PVOL FAULT | RDKC FAULT | SVOL FAULT | INTER DKC PATH FAULT | QUORUM FAULT |
| SMPL | BLOCK | BLOCK | BLOCK | BLOCK | No Change | No Change |
| COPY | BLOCK | BLOCK | SUSPEND | SWITCH | SUSPEND | No Change |
| REV-COPY | REV-SUSPEND | REV-SWITCH | BLOCK | BLOCK | REV-SUSPEND | No Change |
| PAIR | REV-SUSPEND | REV-SWITCH | SUSPEND | SWITCH | SUSPEND | RC-PAIR |
| RC-PAIR | BLOCK | REV-SWITCH | SUSPEND | SWITCH | SUSPEND | No Change |
| SWITCH | BLOCK | BLOCK | SUSPEND | No Change | SUSPEND | No Change |
| REV-SWITCH | REV-SUSPEND | No Change | BLOCK | BLOCK | REV-SUSPEND | No Change |
| SUSPEND | BLOCK | BLOCK | No Change | No Change | No Change | No Change |
| REV-SUSPEND | No Change | No Change | BLOCK | BLOCK | No Change | No Change |
| BLOCK | No Change | No Change | No Change | No Change | No Change | No Change |

[Fig. 22A]
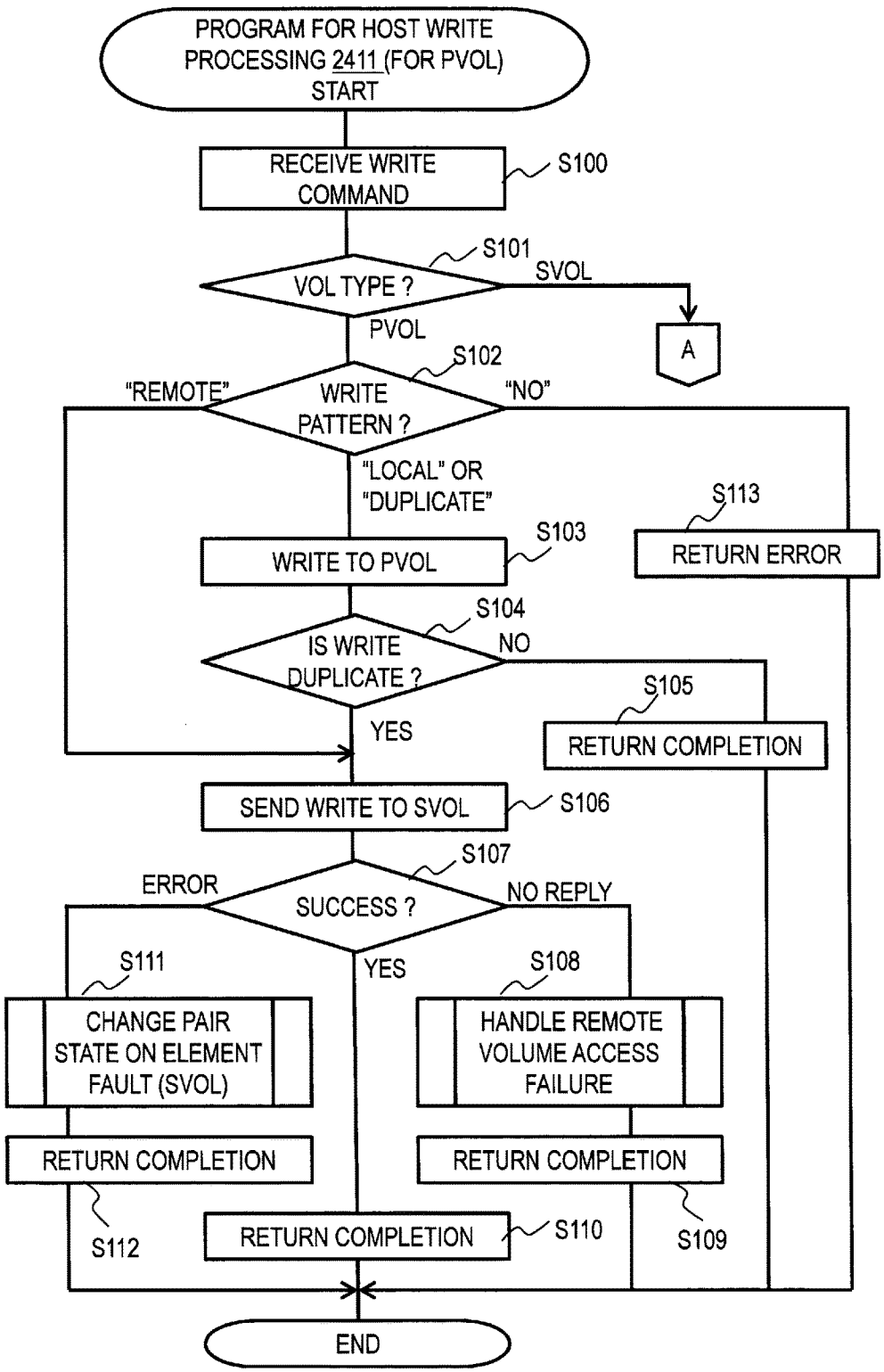

[Fig. 22B]
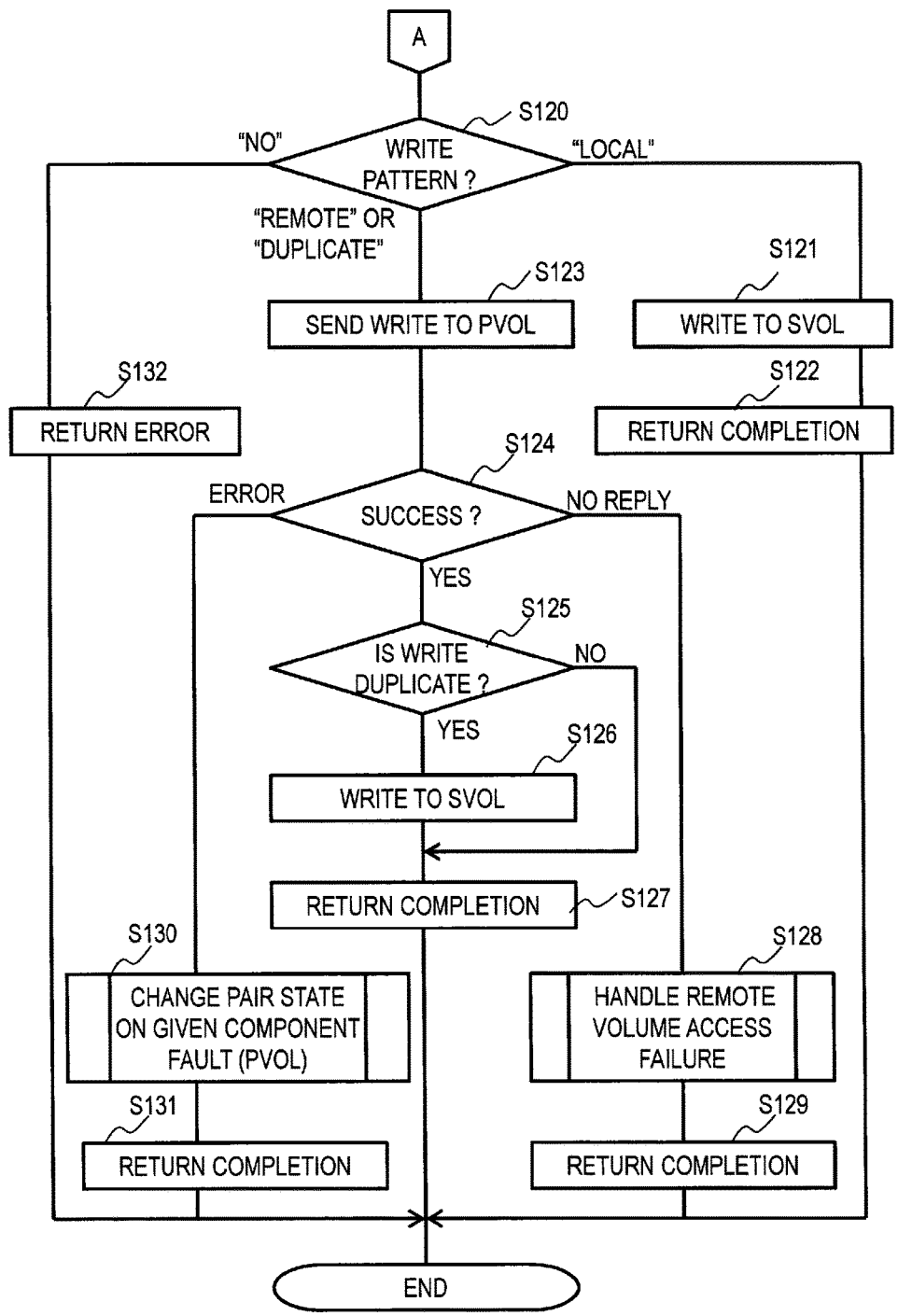

[Fig. 23]
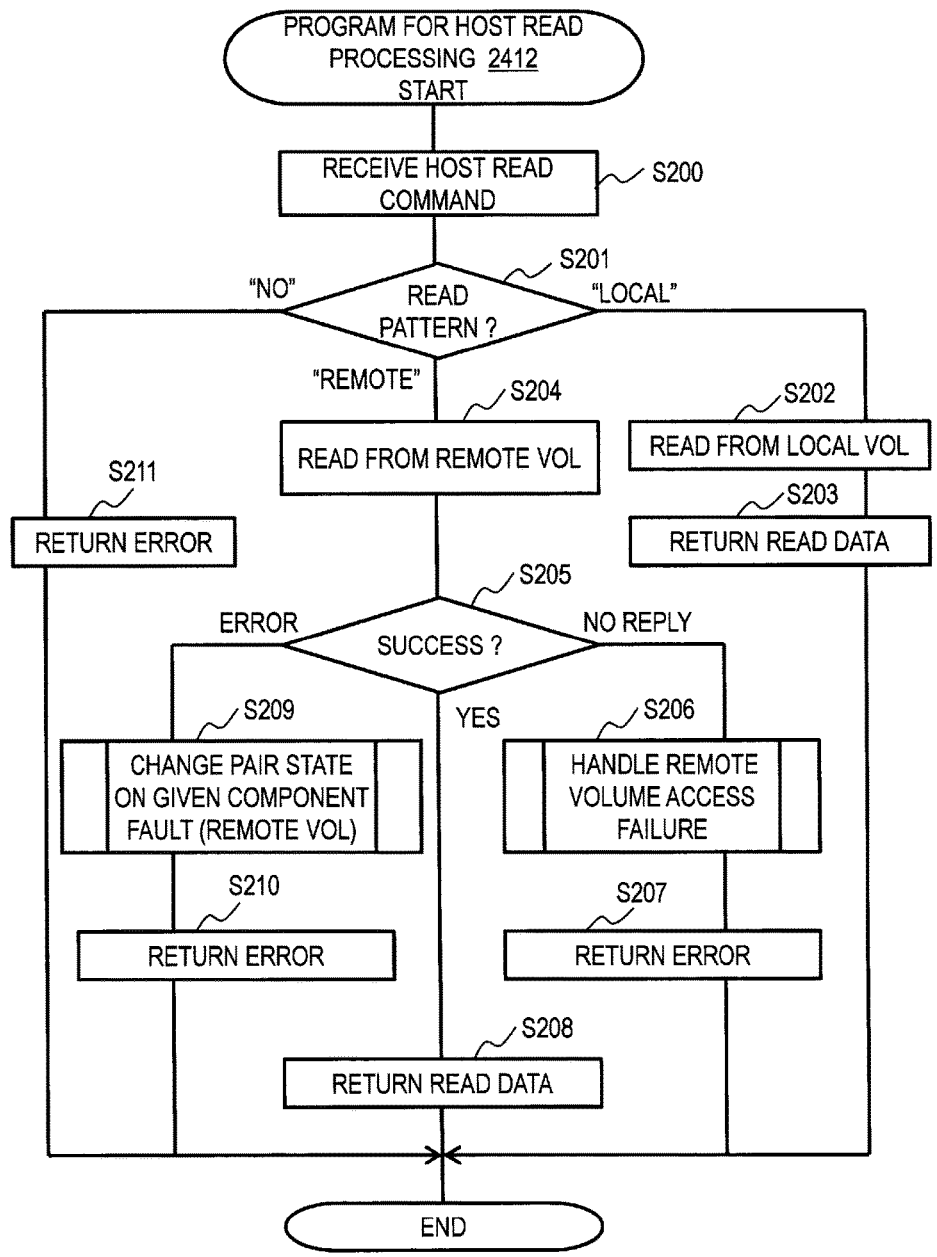

[Fig. 24]
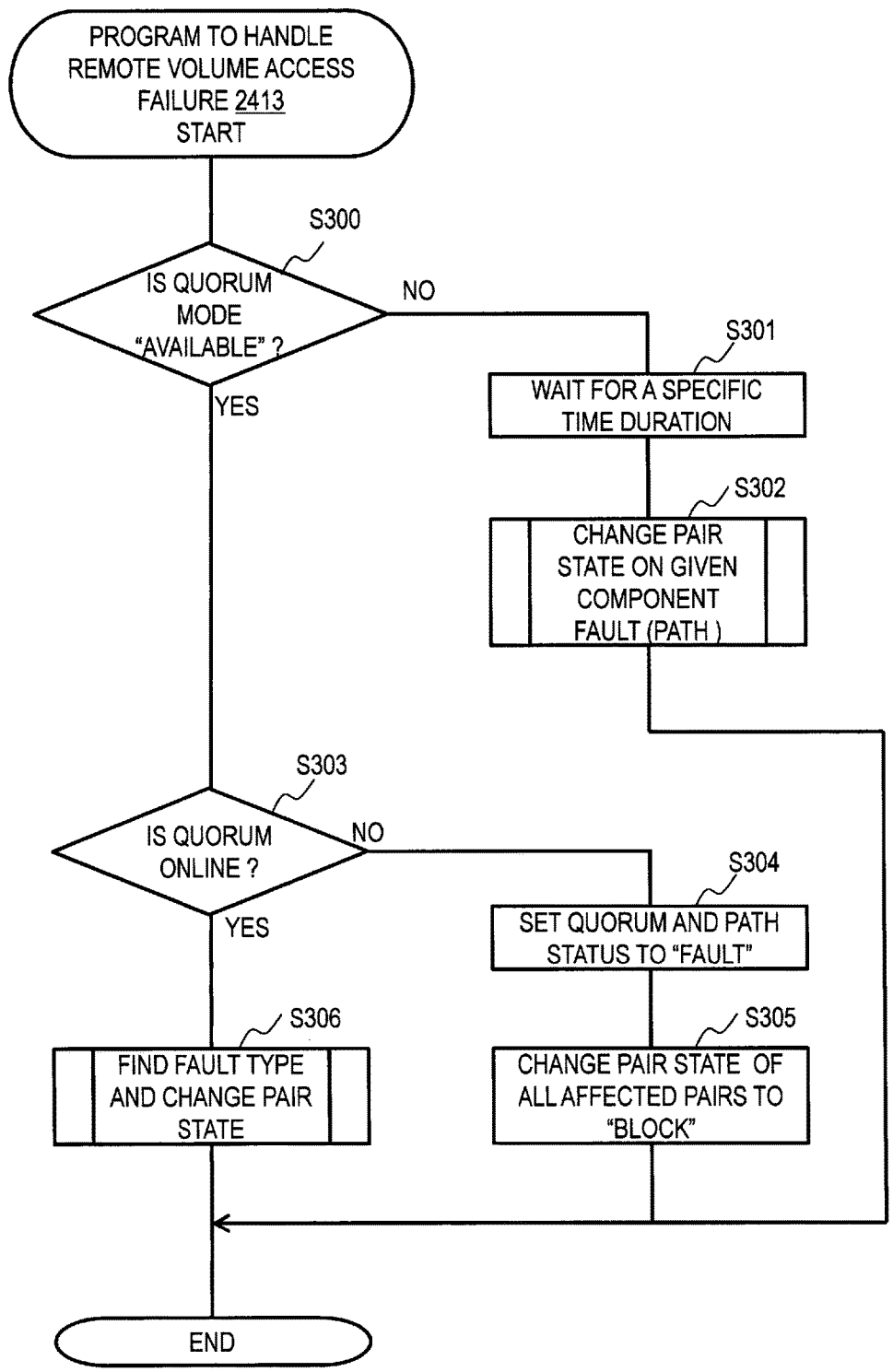

[Fig. 25]
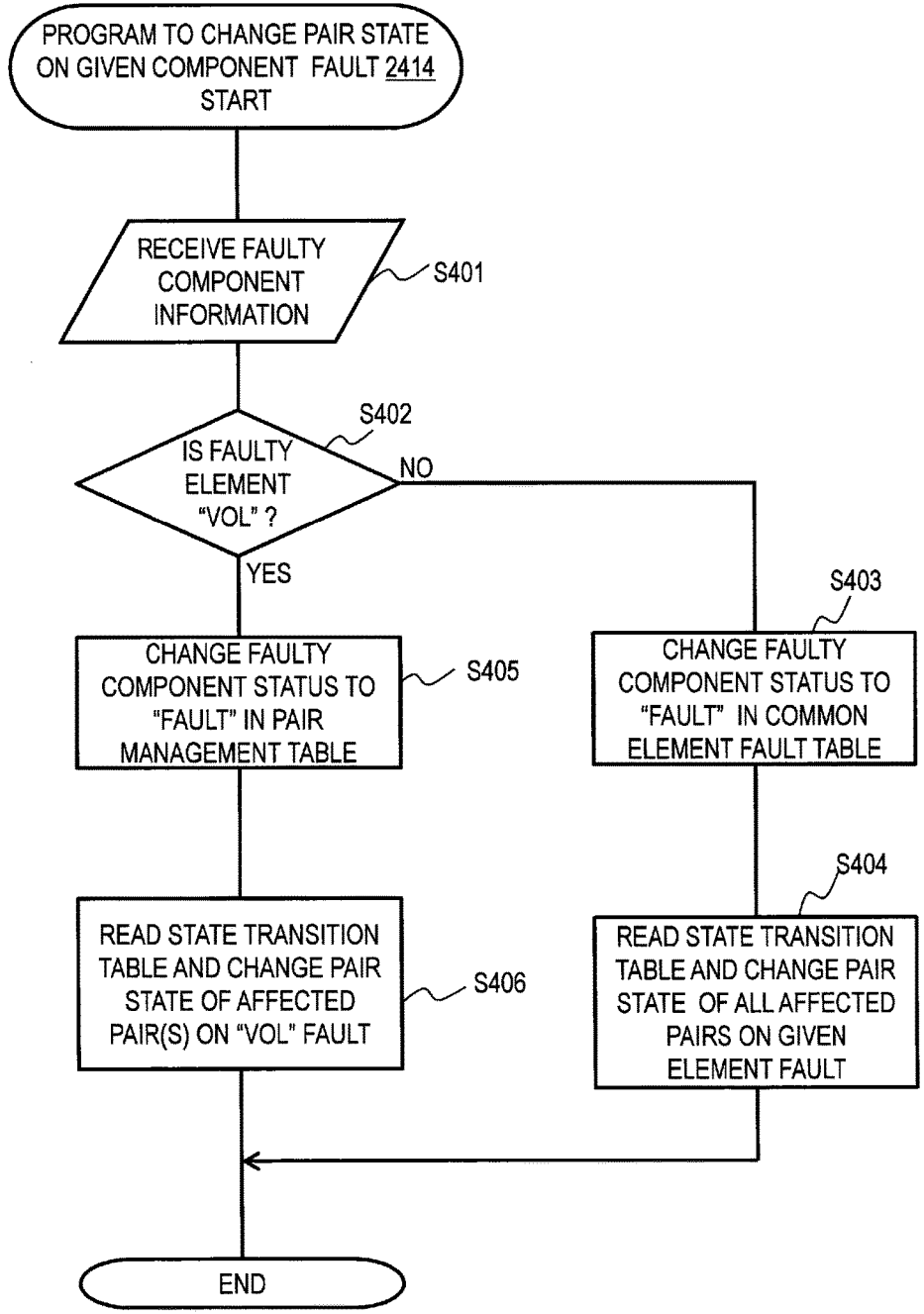

[Fig. 26]
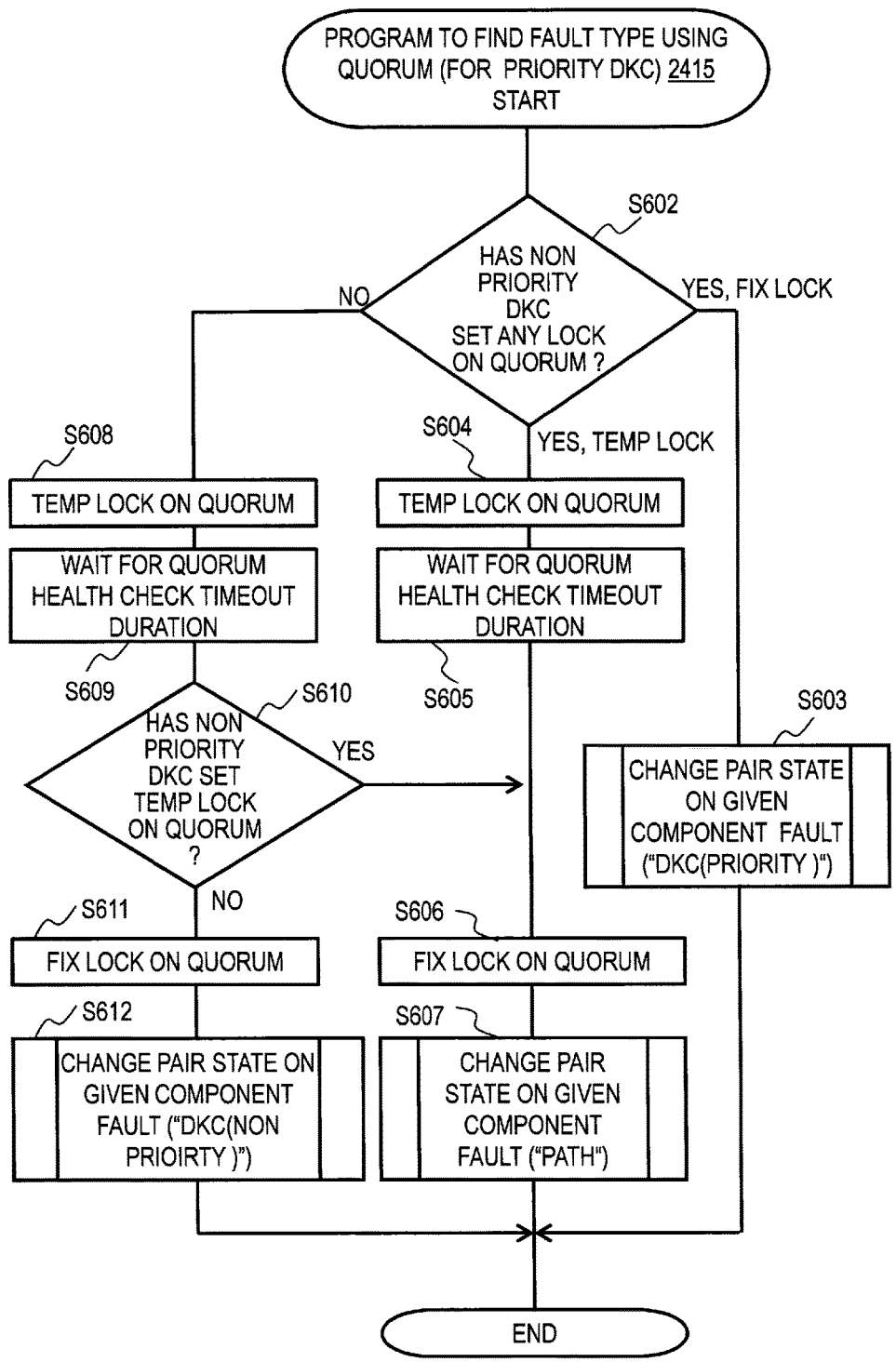

[Fig. 27]
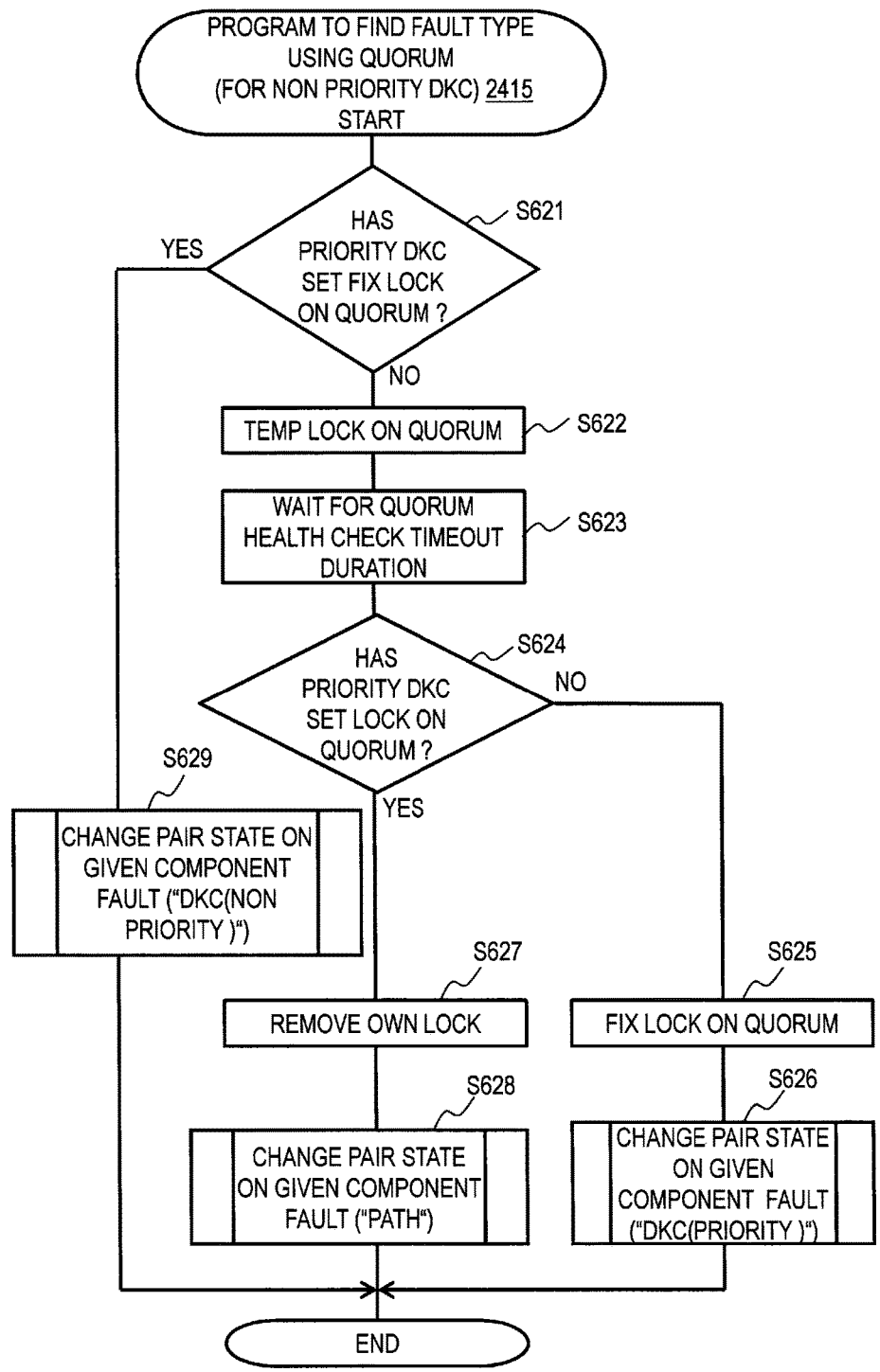

[Fig. 28]
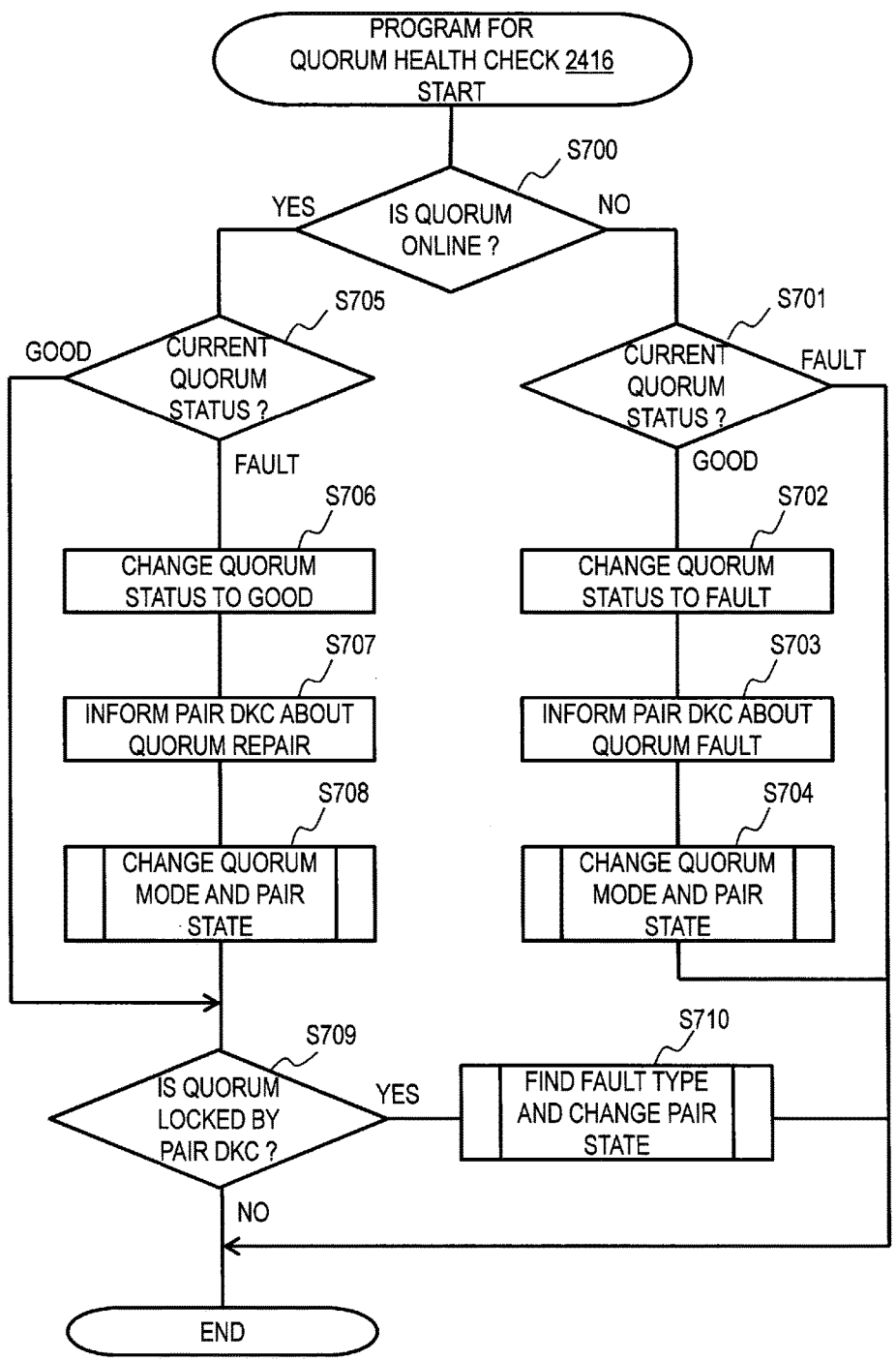

[Fig. 29]
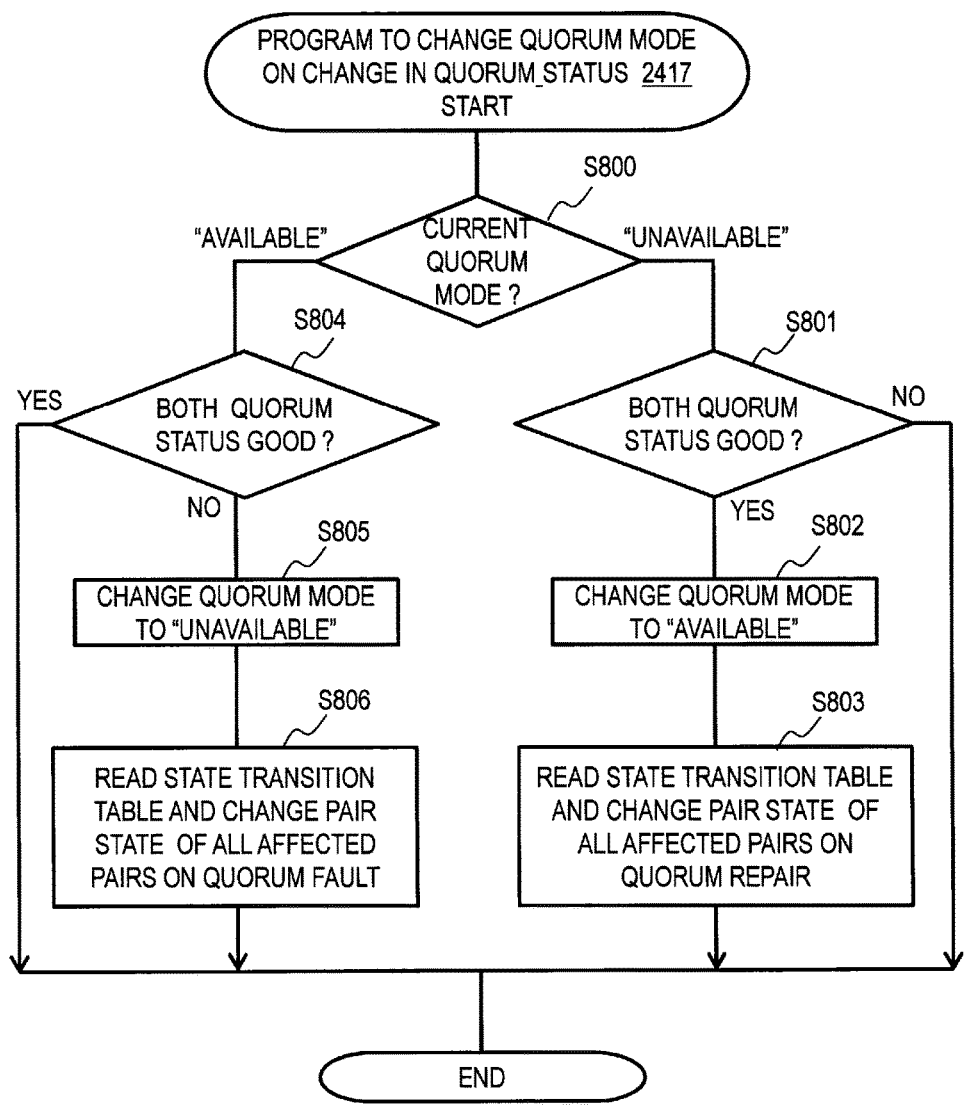

[Fig. 30]
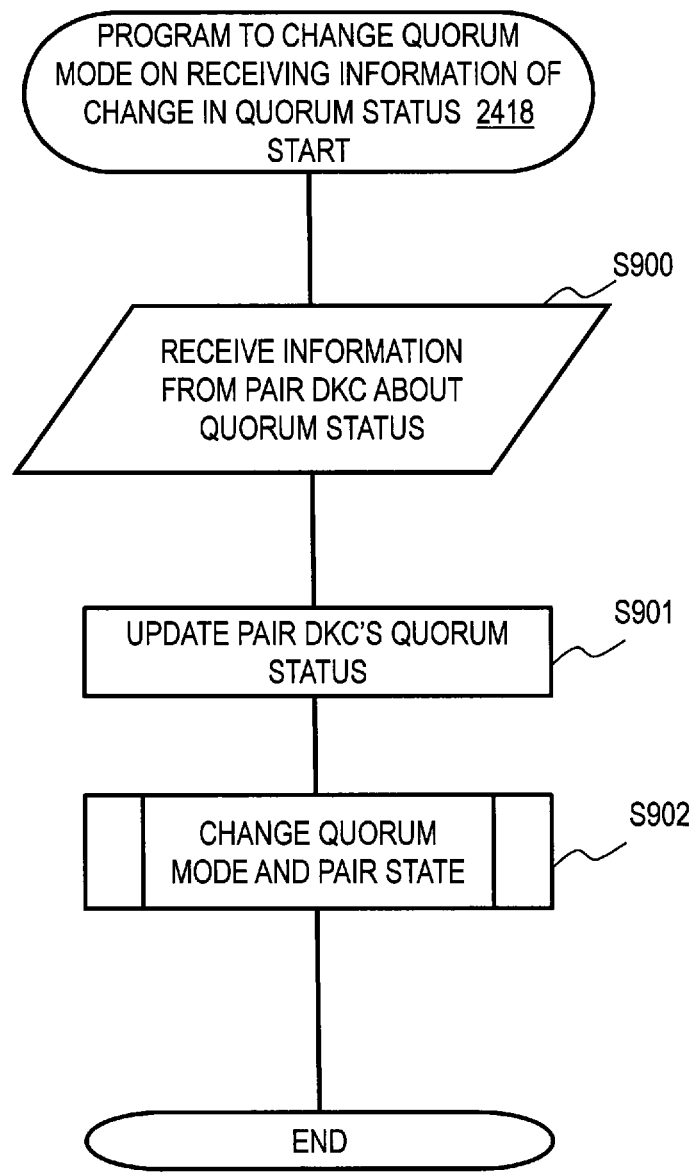

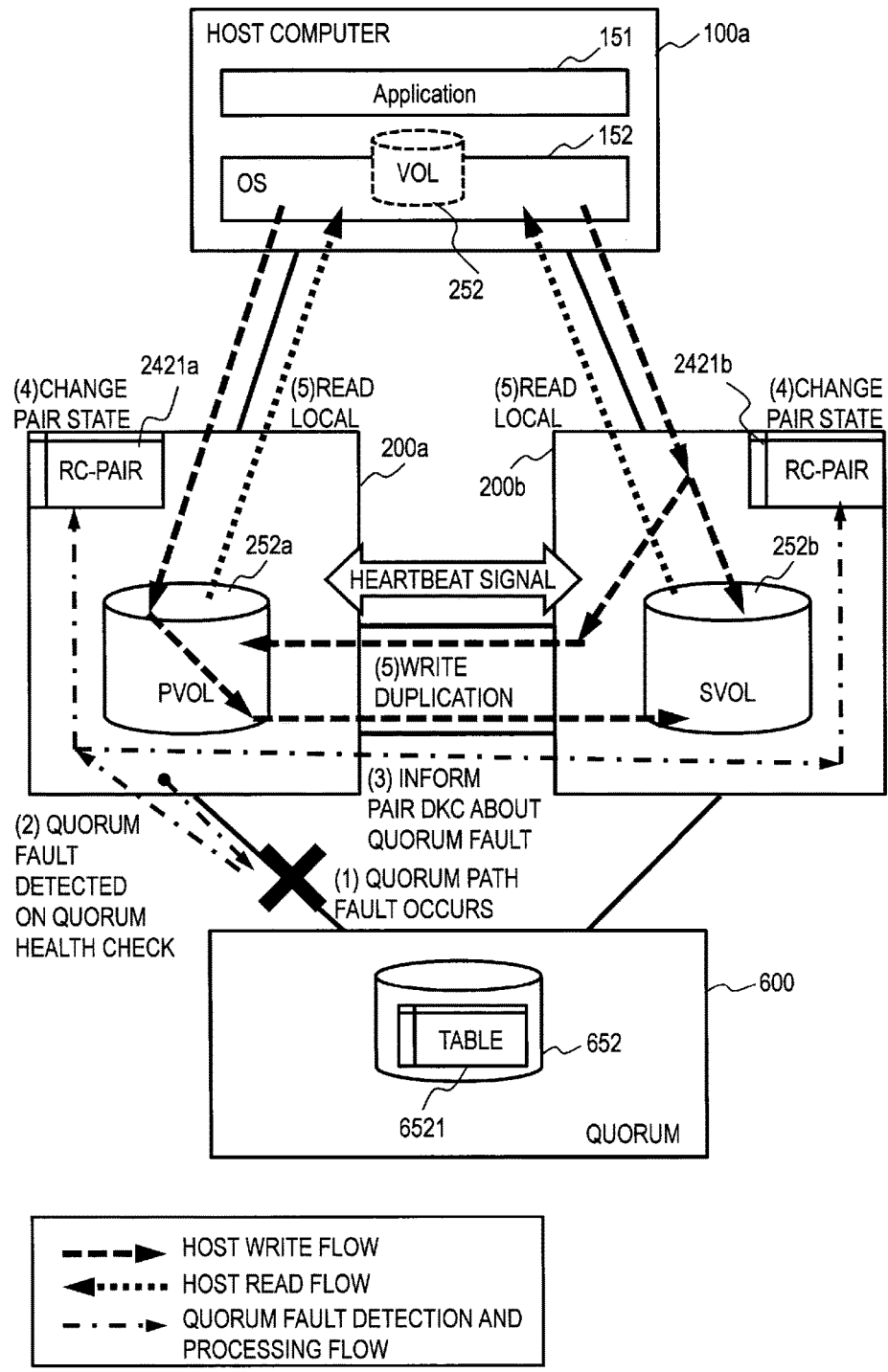
[Fig. 31]

[Fig. 32]
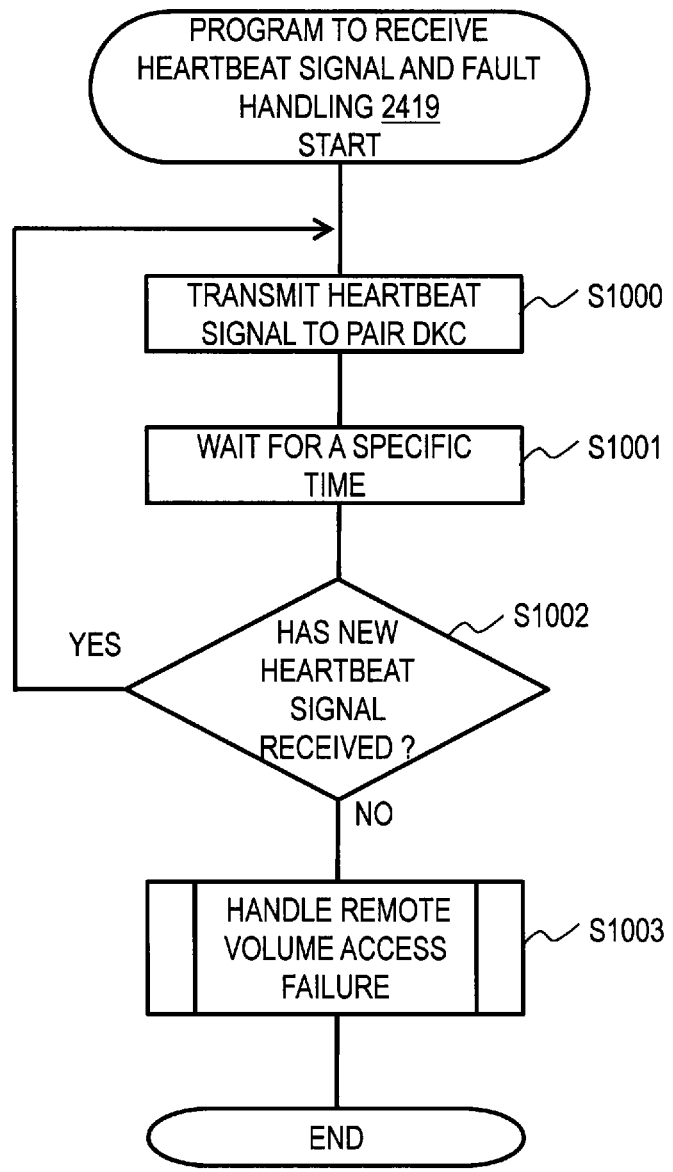

INFORMATION STORAGE SYSTEM

TECHNICAL FIELD

The present invention is related to an information storage system.

BACKGROUND ART

As background arts of the technical field, EP1344133A1, U.S. Pat. No. 5,812,748 and U.S. Pat. No. 7,478,263B1 are known, for example.

EP1344133A1 discloses a method for increasing the availability of a first server included in a computer cluster when a second server fails. Each server in the computer cluster has an associated mass storage device and can process requests from any network device in the computer cluster. Data is mirrored between the mass storage devices of the servers so that each server's mass storage device has a complete copy of all computer cluster data. Data mirroring takes place across a dedicated link. When the first server detects a loss of communication from the second server, the first server determines if the loss of communication is a result of a malfunction of the dedicated link. If the dedicated link has failed, the first server discontinues operation to avoid writing data to its associated mass storage device, which can not be mirrored due to the loss of communication. If the dedicated link is operational, the first server continues operation.

U.S. Pat. No. 5,812,748 discloses a method for improving recovery performance from hardware and software errors in a fault-tolerant computer system. A backup computer system runs a special mass storage access program that communicates with a mass storage emulator program on the network file server, making the disks on the backup computer system appear like they were disks on the file server computer. By mirroring data by writing to both the mass storage of the file server and through the mass storage emulator and mass storage access program to the disks on the backup computer, a copy of the data on the file server computer is made.

U.S. Pat. No. 7,478,263B1 discloses a system and method for permitting bi-directional failover in two node clusters utilizing quorum-based data replication. In response to detecting an error in its partner, the surviving node establishes itself as the primary of the cluster and sets a first persistent state in its local unit. A temporary epsilon value for quorum voting purposes is then assigned to the surviving node, which causes it to be in quorum. A second persistent state is stored in the local unit and the surviving node comes online as a result of being in quorum.

CITATION LIST

Patent Literature

[PTL 1]
EP1344133A1
[PTL 2]
U.S. Pat. No. 5,812,748
[PTL 3]
U.S. Pat. No. 7,478,263B1

SUMMARY OF INVENTION

The storage systems disclosed in the above cited documents have mirrored volumes and, upon detecting loss of communication between the two storage apparatus, use a third storage apparatus (quorum) to vote and decide which storage apparatus should survive and which storage apparatus should stop operation.

In the case of quorum failure (or loss of communication of the storage apparatus with a quorum disk), the above disclosed storage systems take either of the following two approaches in order to avoid the future split brain problem.

In the first approach, upon detecting loss of communication with the quorum, the storage system suspends the data mirroring on the volume pair and completely stops operations on one volume of the volume pair. This approach lowers not only the volume availability but also the reliability of the storage system, because one of the volumes is no longer working as the backup of the other.

In the second approach, after the loss of communication with the quorum, the storage system continues to operate the same way as before the quorum failure. Namely, it mirrors the data on the volume pair. When the second failure occurs in one of the storage apparatuses or the communication path between the storage apparatuses after the loss of communication with the quorum, however, both of the volumes are blocked and the storage system goes down completely. Thus, this approach significantly lowers the availability of the storage system and the lowered availability is lower than the availability of a single volume without mirroring.

Solution to Problem

An aspect of the invention is an information storage system. The information storage system includes a first storage apparatus configured to provide a first logical volume, a second storage apparatus configured to provide a second logical volume, and a quorum accessed from the first storage apparatus and the second storage apparatus and including information regarding states of the first storage apparatus and the second storage apparatus. The first storage apparatus and the second storage apparatus are configured to make a host recognize the first logical volume and the second logical volume as a single volume. The first storage apparatus is configured to read data from the first logical volume and send the data to the host upon receiving a read command to the single volume sent from the host. The second storage apparatus is configured to read data from the second logical volume and send the data to the host upon receiving a read command to the single volume sent from the host. The first storage apparatus is configured to, upon receiving a write command to the single volume sent from the host, send a write completion acknowledgement to the host after completion of writing data to the first logical volume and the second logical volume. The second storage apparatus is configured to, upon receiving a write command to the single volume sent from the host, send a write completion acknowledgement to the host after completion of writing data to the first logical volume and the second logical volume. The second storage apparatus is configured to, after detecting communication failure with the quorum, halt use of the quorum and check communication with the first storage apparatus for failure before responding to the host for each of read and write commands sent from the host.

Advantageous Effects of Invention

According to an aspect of the present invention, the availability and reliability of an information storage system is enhanced.

BRIEF DESCRIPTION OF DRAWINGS

FIG. 1 schematically shows a diagram illustrating the detection of loss of communication between a quorum storage apparatus and a storage apparatus, and subsequent quorum mode change in accordance with an embodiment.

FIG. 2 is a diagram showing an example of the hardware configuration of an information system according to an embodiment.

FIG. 3 shows an example of contents stored in a cache memory package of a storage apparatus according to an embodiment.

FIG. 4 schematically shows a diagram illustrating the processing of read/write commands from a host computer when all components of the information processing system are working normally in accordance with an embodiment of the present invention.

FIG. 5A schematically shows a diagram illustrating the processing of host write command in Available mode when communication loss between the two storage apparatuses occurs, in accordance with an embodiment.

FIG. 5B schematically shows a diagram illustrating the processing of host write command in Available mode when both the storage apparatus of HA pair contains at least one PVOL and one SVOL each, and a communication loss between the two storage apparatus occurs, in accordance with an embodiment.

FIG. 6 schematically shows a diagram illustrating the processing of host write command in Available mode when one of the storage apparatus fails, in accordance with an embodiment.

FIG. 7 schematically shows a diagram illustrating the detection of loss of communication between a quorum storage apparatus and a storage apparatus, and subsequent quorum mode change in accordance with an embodiment.

FIG. 8 shows an example of a state machine for the "Copy" state.

FIG. 9 shows an example of a state machine for the "Rev-Copy" state.

FIG. 10 shows an example of a state machine for the "Pair" state.

FIG. 11 shows an example of a state machine for the "RC-Pair" state.

FIG. 12 shows an example of a state machine for the "Switch" state.

FIG. 13 shows an example of a state machine for the "Rev-Switch" state.

FIG. 14 shows an example of a state machine for the "Suspend" state.

FIG. 15 shows an example of a state machine for the "Rev-Suspend" state.

FIG. 16 shows an example of a state machine for the "Block" state.

FIG. 17 shows an example of table for quorum lock management.

FIG. 18 shows an example of table for pair management.

FIG. 19 shows an example of table for current status of common components.

FIG. 20 shows an example of table for I/O process pattern in each pair state.

FIG. 21 shows an example of table for pair state transition on single component fault.

FIG. 22A shows a portion of a flowchart of program for host write processing (for host writes directed to PVOL).

FIG. 22B shows a portion of a flowchart of program for host write processing (for host writes directed to SVOL).

FIG. 23 shows a flowchart of program for host read processing.

FIG. 24 shows a flowchart of program to handle remote volume access failure.

FIG. 25 shows a flowchart of program to change pair state on given component fault.

FIG. 26 shows a portion of a flowchart of program to find fault type using quorum (for Priority DKC).

FIG. 27 shows a portion of a flowchart of program to find fault type using quorum (for Non-Priority DKC).

FIG. 28 shows a flowchart of program for quorum health check.

FIG. 29 shows a flowchart of program to change quorum mode on change in quorum status.

FIG. 30 shows a flowchart to program to change quorum mode on receiving information of change in quorum status.

FIG. 31 schematically shows a diagram illustrating the detection of loss of communication between a quorum storage apparatus and a storage apparatus, and subsequent quorum mode change in accordance with an embodiment.

FIG. 32 shows a flowchart of program to receive heartbeat signal and fault handling.

DESCRIPTION OF EMBODIMENTS

Embodiments of the present invention are described below with reference to the accompanying drawings. The embodiments to be described below, however, shall not limit the present invention according to the claims. All combinations of features described in the embodiments are not always essential as means of the solutions stated in the present invention.

The embodiments relate to an information storage system and method to improve availability and reliability of the information storage system. More specifically, the embodiments relate to, for example, techniques for eliminating the split brain problem by communicating with a third storage apparatus including a quorum disk, and by using heartbeat signals or remote access when the third storage apparatus becomes unavailable. In the embodiments, quorum includes quorum information, a quorum disk storing the quorum information and a storage apparatus having the quorum disk.

Referring to FIG. 1, the outline of the present embodiments will be described. FIG. 1 illustrates an information system the present embodiments provide. The information system includes a first storage apparatus 200a, a second storage apparatus 200b and a third storage apparatus 600. The first storage apparatus 200a is connected to a host computer 100a and includes a first volume 252a. The second storage apparatus 200b is connected to the host computer 100a and the first storage apparatus 200a, and includes a second volume 252b. The third storage apparatus 600 is connected to the first and the second storage apparatuses 200a and 200b and includes a third volume 652.

The first and the second storage apparatuses 200a and 200b return the same identity information for the first and the second volumes 252a, 252b respectively to the host computer 100a. The host computer 100a recognizes the volumes 252a, 252b as a single volume 252. The volume 252 may be called a virtual volume in the embodiments.

In FIG. 1, long dashed lines represent the host write flow. Short dashed lines represent the host read flow. Alternate long and short lines represent the quorum fault detection and processing flow.

The host computer may have multipathing software in addition to an application program 151 and an OS 152. On discovering a virtual volume 252 being accessible by two paths, one is to the first volume 252a and the other to the second volume 252b, the multipathing software selects one path for a read/write command from the OS 152 based on the situation and the settings.

In a normal case, the first and second volumes 252a, 252b are coupled so as to be the mirror of each other. Namely, all the host write operations for either volume write user data to both of the volumes 252a, 252b. Each host read operation is performed locally. Namely, the storage apparatus receiving a read command from the host computer 100a reads user data from its own volume (including reading from a cache memory) and returns the user data to the host computer.

The third volume 652 is used for storing quorum information and avoiding the split brain problem in the event of communication loss between the first and the second storage apparatuses 200a and 200b.

When the first (or second) storage apparatus 200a (or 200b) detects a communication failure with the third storage apparatus 600, the first (or second) storage apparatus 200a (or 200b) changes its operation mode to the "Unavailable" mode from the "Available" mode. The first (or second) storage apparatus 200a (or 200b) also informs the second (or first) storage apparatus 200b (or 200a) of the detected fault in communicating with the third storage apparatus 600 and instructs it to change to the operation mode to the "Unavailable" mode.

In the "Unavailable" mode, when a communication failure occurs between the first and the second storage apparatuses 200a and 200b, the first and the second storage apparatuses 200a and 200b do not use the third storage apparatus 600 to determine the status of the other storage apparatus, instead they use predefined rules to decide on the survivor and non-survivor volumes.

In the "Unavailable" mode, duplication of host write commands to the first and the second volume continues, however, host read commands are serviced in such a way that a communication loss between the two storage apparatuses 200a and 200b can be detected promptly and the split brain problem does not occur.

One of the ways to achieve it is to use a timely heartbeat signal between the first and the second storage apparatuses 200a and 200b to check the health of communication path and of each other (storage apparatuses). If any communication loss occurs, it is detected by not receiving the heartbeat signal within the predefined time duration.

In another way, all host read commands received on either of the two storage apparatuses 200a and 200b are serviced by reading user data from only the volume which has been decided to be the survivor volume when switched to the "Unavailable" mode. In this way, the storage apparatus having the non-survivor volume detects a communication loss when it services either a host read operation or a host write operation, thus the split brain problem is avoided.

With these approaches, even after the loss of communication with third storage apparatus 600, 1) the user data continues to be duplicated in the first and second storage apparatuses 200a and 200b, and 2) in the case of a failure of the pre-defined non-survivor volume or a failure of the communication link between the first and the second storage apparatuses, the storage apparatus having the survivor volume continues to handle read and write commands on the survivor volume.

In the event of loss of communication with third storage apparatus 600, 1) host write data continues to be duplicated in the first and second storage apparatus 200a and 200b, thus the decrease of reliability of the storage system is prohibited and 2) in the case of a failure of the pre-defined non-survivor volume or a failure of communication link between the first and the second storage apparatuses 200a and 200b, the survivor volume (the storage apparatus having the survivor volume) continues to process I/O, thus the availability of the storage system remains the same as in the case of a single volume (the survivor volume) and is better in comparison to the storage system which completely shuts down on such a failure.

<First Embodiment>
<Configuration of Information System>

FIG. 2 is a diagram showing an example of the hardware configuration of an information system according to an embodiment.

The information system includes host computers (hereafter abbreviated as a "host(s)") 100a and 100b, a storage system 200 which including two storage apparatuses 200a and 200b, a third storage apparatus 600 and a management computer 300.

The storage apparatuses 200a and 200b and the hosts 100a, 100b are mutually connected via a network 500 (500a, 500b, 500c, 500d). Any network that can perform data communication can be used, such as a SAN (Storage Area Network), LAN (Local Area Network), Internet, leased line and public line. Any protocol can be used for the network if data can be exchanged between the hosts 100a, 100b and the storage apparatuses 200a and 200b, such as Fibre Channel protocol or TCP/IP protocol. The management computer 300 and the storage apparatuses 200a and 200b are connected via a dedicated management network 400 (400a, 400b). Alternatively, the management computer 300 can also use the I/O network 500 to communicate with the storage apparatuses 200a and 200b.

The host 100a has a host internal network 104, and coupled to this network 104 are at least a processor (abbreviated as CPU in the diagram) 102, a memory 103, and an I/O ports 101 (101a, 101b). In this example, hosts 100a and 100b are identical. The management computer 300 may also have the same hardware configuration as the host 100a. Incidentally, an expansion card for adding an I/O port to the host is sometimes referred to as an HBA (Host Bus Adapter).

The storage apparatus 200a includes a plurality of I/O ports 211 (211a-211e), a plurality of microprocessor packages (hereinafter, MP-PK) 220, a plurality of cache memories packages (hereinafter, CM-PK) 240, a plurality of back end ports (hereinafter, BE-Ports) 230, a network interface 260, and an internal network 270. The packages are interconnected by way of the internal network (for example, a crossbar switch) 270. Furthermore, the number of at least one of the I/O Ports 211, MP-PK 220, CM-PK 230 and BE-Ports 230 may be one. The I/O ports 211a, 211b receive the I/O commands (write command/read commands) from the hosts 100a, 100b, respectively.

The MP-PK 220 has one or more processors 221 and a local memory 222. The microprocessor(s) of MP-PK 220 performs a variety of processing by executing a computer program. They are, for example, the processing of the I/O command from the hosts 100a, 100b, etc. The local memory 222 is able to store various data, for example, a computer program executed by the processor 221 and control information used by the computer program. The MP-PK 220 communicates with the management computer 300 through the network interface 260. The network interface 260 is a communication interface device, for example, a LAN controller.

The CM-PK 240 has one or more memories. For example, the CM-PK 240 has a shared memory 241, a program memory 242 and a cache memory 243 (shown in FIG. 3). The cache memory 243 temporarily stores host data written to VOLs from the host 100 and host data read out from VOLs by the host 100. The shared memory 241 stores control information for communication between MP-PKs 220. The control information includes configuration data related to the configuration of the storage apparatuses 200a and 200b. The program memory 242 stores programs to be executed by different MP-PKs 220. These programs can be cached in the local memory 222 of the concerned MP-PK 220.

The memory devices 251 (251a, 251b) are non volatile memories and may be, for example, hard disk drives (HDD). The memory devices 251 may be provided in one piece with or separately as independent devices from the storage apparatus 200a. These memory devices 251 may implement the RAID (Redundant Array of Independent Disk) technology and the storage regions provided by the memory devices 251 are managed in units of logical volumes 252, which are volumes that are logically established on the storage regions. Data can be written in or read from the memory devices 251 by designating LUNs (Logical Unit Numbers) that are identifiers appended to the corresponding logical volumes 252.

The structure of storage apparatus 200b, in this embodiment, is identical to the storage apparatus 200a. The two storage apparatuses 200a and 200b need not be identical if the two storage apparatuses 200a and 200b can successfully execute the programs described in this embodiment along with reading/writing data from/to logical volumes. The storage apparatuses 200a and 200b are connected by a data transfer network 501 (501a, 501b), for example, Fibre Channel SAN.

The storage apparatus 600, for example, may have the same structure as the storage apparatus 200a (200b) or comparatively simpler structure that is able to read from and write to a logical volume 652 that is managed on a HDD 651. For example, the storage apparatus 600 may use a SCSI compatible HDD. The storage apparatus 600 is connected with the storage apparatus 200a and 200b with the data transfer network 500 (502a, 502b), for example, Fibre Channel SAN.

In this embodiment, for example, in order to avoid total data loss in the case of natural disaster, etc. that can destroy a complete data center, the two storage apparatuses 200a and 200b are located, for example, in two different sites (failure domains) far from each other, respectively. The distance between the two sites is limited by RTT (Round-Trip delay Time) which is low enough to be tolerated by the hosts while accessing logical volumes in either storage apparatus. Also, for example, the third storage apparatus 600 is put far from both the storage apparatus 200a and 200b, in a third failure domain. This configuration helps increase the availability of data in the information system shown in FIG. 3, in case of some accident or natural disaster causing data at one of the storage apparatus to be lost. If required, all three storage apparatus (200a and 200b, 600) can be put in single data center or in some other configuration.

<Configuration of CM-PK>

FIG. 3 illustrates an example configuration of the cache memory package (CM-PK) 240. The CM-PK 240 includes a program memory 241, a shared memory 242 and a cache memory (not shown in FIG. 3).

The program memory 241 holds a program for host write processing 2411, a program for host read processing 2412, a program to handle remote volume access failure 2413, a program to change pair state on given component fault 2414, a program to find fault type using quorum 2415, a program for quorum health check 2416, a program to change quorum mode and pair state on change in quorum status 2417, a program to change quorum mode on receiving information of change in quorum status 2418, and a program to receive heartbeat signal and handle fault 2419. Program 2419 is not executed in this embodiment.

The shared memory 242 holds a table for pair management 2421, a table for current status of common components 2422, a table for I/O process pattern in each pair state 2423, a table for pair state transition on single component fault 2424, and a table for pair state transition on component repair 2425. The cache memory 243 is used for temporarily storing data.

Operational examples of the programs 2411 to 2419 in the program memory 241 will be described referring to FIG. 22A to FIG. 30 and FIG. 32 later. Examples of the tables 2421 to 2425 in shared memory 242 will be described referring to FIG. 17 to FIG. 21.

<Overview of the Embodiment>

In this embodiment, in order to improve the availability of the storage system 200 including the storage apparatuses (hereinafter, also referred as DKCs) 200a and 200b, a duplex configuration is used as shown in FIG. 4.

FIG. 4 is a simplified logical diagram of FIG. 2 for the sake of easier understanding. In FIG. 5, only host 100a, which is used for explaining the I/O flow and the rest in this embodiment, is shown. The I/O flow with host 100b is similar.

In FIG. 4, long dashed lines represent the host write flow. Short dashed lines represent the host read flow. Alternate long and short lines represent the quorum health check.

In this embodiment, the storage administrator first creates an HA volume pair 252 using volumes 252a and 252b by sending a command (for example "Create HA Pair") with information about a primary volume (hereinafter, PVOL) and a secondary volume (hereinafter, SVOL) to storage apparatuses 200a and 200b using management computer 300 (not shown in FIG. 4). In this embodiment, the volume pair 252 also referred as a virtual volume 252 since the volume pair 252 is recognized as a single volume by host 100a.

A PVOL is a volume that has been assigned the right to survive (continue I/O processing) in the case of communication loss between the storage apparatuses 200a and 200b. An SVOL is a volume which is blocked (I/O processing discontinued) to maintain the data consistency, in the case of communication loss between the storage apparatuses 200a and 200b. In this embodiment, the storage administrator defines the volume 252a as the PVOL and the volume 252b as the SVOL.

For a HA pair, the storage apparatus having the PVOL is called Main DKC (hereinafter, MDKC) and the storage apparatus having the SVOL is called Remote DKC (hereinafter, RDKC). For the HA volume pair 252, the storage apparatus 200a is the MDKC and the storage apparatus 200b is the RDKC. Note that there can be a plurality of HA pairs in storage apparatuses 200a and 200b although only the HA pair 252 is shown in FIG. 4. For example, if one more HA pair exists with its PVOL in the storage apparatus 200b and its SVOL in the storage apparatus 200a, the MDKC for this HA pair is the storage apparatus 200b and the RDKC for this pair is the storage apparatus 200a.

Upon receiving a "Create HA Pair" command, the storage apparatus 200a adds an entry of the provided PVOL and SVOL as an HA pair with its pair state as the "Copy" state in the pair management table 2421a. Storage apparatus 200b also adds a similar entry in the pair management table 2421b.

The storage system 200 makes the host 100a believe that the volumes 252a, 252b accessed using network 500a and 500b respectively are a single volume (virtual volume 252)

with two different network paths leading to it. So that, in a case where one volume fails, the host 100a thinks that one path leading to the virtual volume 252 has failed and it will continue I/O using another path, which is in fact another volume.

In order to achieve this situation, the storage apparatuses 200a and 200b return same identity information of the volumes 252a and 252b respectively, when requested by the host 100a, for example, in response to a SCSI inquiry command issued by the host 100a. The common identity information can be provided, for example, by the management computer 300, or the two storage apparatuses 200a and 200b can communicate with each other and decide on the common identity information for the HA volume pair 252.

When the host 100a discovers one volume 252 on two different ports of the storage system 200, the host 100a uses either or both of the two network paths 500a and 500b to access the volume 252. The host 100a, for example, can use multipathing software for this purpose.

Once the configuration for the HA pair 252 is completed, the storage apparatus 200a starts copying data of the PVOL 252a to the SVOL 252b (initial copy). Once the copy is finished, the pair state of the HA pair 252 in the tables 2421a, 2421b is changed to the "Pair" state by the respective storage apparatuses. In the "Pair" state, both volumes have the same data and are synchronized with each other.

When the application 151 wants to read/write some data from/to the volume, it sends the read/write command through the OS 152 and the multipathing software selects a path to transfer the read/write command to the selected storage apparatus. The multipathing software can choose either path to send the read/write command.

FIG. 4 also shows the schematic flow of data read/write by the storage apparatuses. In a normal case, i.e. when all the components of storage apparatuses 200a and 200b are working in good condition (without any failure), a write command, issued by host 100a to a storage system 200 (200a or 200b), is duplicated to the PVOL 252a and the SVOL 252b. Since both the storage apparatuses 200a and 200b can independently receive a write command, data consistency is maintained by some well known method.

For example, in this embodiment, the write data for all write commands is first written to the PVOL 252a and then to SVOL 252b. Thus, the storage apparatus 200a, upon receiving a write command, checks whether the target volume for the command is the PVOL 252a or the SVOL 252b. For example, as shown in FIG. 5, if it is the PVOL 252a, the storage apparatus 200a writes the write date to the PVOL 252a then sends the write data to the SVOL 252b in the storage apparatus 200b. Once the write to the SVOL 252b is completed and the storage apparatus 200b acknowledged it to the storage apparatus 200a, the storage apparatus 200a sends the write completion acknowledgement to the host 100a.

On the other hand, if the storage apparatus 200b receives the write command and it finds that its volume is the SVOL 252b, it transfer the write data to the PVOL 252a in the storage apparatus 200a and after receiving the write completion acknowledgement from the storage system 200a, it writes the write data to the SVOL 252b and then returns the write completion acknowledgement to the host 100a.

Since the data is duplicated in real time in the HA volume pair 252, reading from either 252a or 252b will give the same data, and a read command issued to the volume 252a is processed locally using the volume 252a in the storage apparatus 200a. Similarly a read command issued to the volume 252b is processed locally using the volume 252b in the storage apparatus 200b. An example flow of read/write command processing by the storage apparatuses will be explained later in this embodiment using FIG. 22A, FIG. 22B and FIG. 23.

In order to 1) make sure that in the case of some fault, one of the two volumes (PVOL or SVOL) can continue I/O, 2) to avoid the "split brain problem" and C) to check if the quorum is working fine or not, the storage apparatuses 200a and 200b communicates with the quorum storage apparatus 600 (the third storage apparatus) in timely manner and check whether the storage apparatus 200b has detected a loss in communication with 200a by reading the temp lock entry of the lock management table 652 in the quorum storage apparatus 600 (the volume 652). This process is called quorum health check, and executed by the program for quorum health check 2416. The storage apparatus 200b also performs the quorum health check timely and the duration between two health checks may be the same as the storage apparatuses 200a. An example flow of quorum health check will be explained later using FIG. 28.

<Process on Inter DKC Network Failure>

FIG. 5A shows a case of fault in the network 501b and the flow of host write as well as detection of fault during the host write process. In FIG. 5 A, long dashed lines represent the host write flow on detecting path fault.

In this case, the HA pair 252 was working in the "Pair" state when a fault in the network 501b occurred. Now if the host 100a issues a write command to the MDKC 200a, the MDKC 200a first writes the data to the PVOL 252a and tries to duplicate the data in the SVOL 252b because the HA pair state in the table for pair management 2421a remains to be the "Pair" state until the fault is detected.

The MDKC 200a sends this write command to the SVOL 252b in the RDKC 200b; however, since the network 501b has a fault, the command remains unanswered. The MDKC 200a needs to know whether this situation has occurred due to failure of the RDKC 200b or due to failure in the network 501b. So the MDKC 200a communicates with the quorum storage apparatus 600 and tries to find out whether the RDKC 200b is working fine or not by setting up temp lock in the quorum table 6521 in the quorum storage apparatus 600. This process is executed by the program to handle remote volume access failure 2413 and the program to find fault type using quorum 2415. Example flows of these programs are shown in FIG. 24 and FIG. 26 respectively and will be explained later.

On performing the quorum health check (explained using FIG. 28), the RDKC 200b finds out that the PVOL 252a is trying to lock the quorum, i.e. the MDKC 200a has detected communication loss with the RDKC 200b. In such a case, the RDKC 200b will inform the MDKC 200a that it is alive by setting a temp lock on the quorum table 6521. This process is executed by the program 2415 for the RDKC 200b. An example flow of such program is shown in FIG. 27.

After communicating with the quorum storage apparatus 600, the MDKC 200a finds out that the RDKC 200b is working fine, so the MDKC 200a sets a FIX lock on the quorum table 6521 informing the RDKC 200b that the PVOL 200a will survive and the RDKC 200b should block the SVOL 252b. The MDKC 200a and the RDKC 200b then change the pair state to the "Suspend" state in their respective pair management tables 2421a, 2421b. Since the write data has already been written to the PVOL 252a, the MDKC 200a returns the write completion acknowledgement to the host 100a.

<Process on Inter DKC Network Failure when a DKC Contains a PVOL and an SVOL>

FIG. 5b shows a case where the storage system 200 has two HA pairs 252 and 253 with storage apparatus 200a containing the PVOL 252a of the HA pair 252 and the SVOL 253b of the HA pair 253, and storage apparatus 200b containing the SVOL 252b of the HA pair 252 and the PVOL 253a of the HA pair 253. In this configuration, an inter DKC network fault occurs. As for the HA pair 252, it will be the same as explained referring to FIG. 5A.

For the HA pair 253, the MDKC is the storage apparatus 200b and the RDKC is the storage apparatus 200a. So, the case of the HA pair 253 is also the same as explained for FIG. 5A when the MDKC and the RDKC are inverted. The table for quorum lock management 6521 has two entry rows, one for each storage apparatus when it works as a MDKC. So when the storage apparatus 200b is used as a MDKC, the second entry row is used in the case of the HA pair 253 and the PVOLs 252a, 253a of both the HA pairs 252, 253 survive and the SVOLs 252b, 253b of both the HA pairs 252, 253 are blocked.

<Process on MDKC Failure>

FIG. 6 shows a case of fault in a MDKC and the flow of host write as well as detection of a fault during the host write process. In FIG. 6, long dashed lines represent the flow of path fault detection on host write and further processing.

In this case, the HA pair 252 was working in the "Pair" state when a fault in the MDKC 252a occurred. Now if the host 100a issues a write command to the RDKC 200b, the RDKC 200b first tries to duplicate the data in the PVOL 252a because the HA pair state remains to be the "Pair" state until the fault is detected. The RDKC 200b sends the write command to the PVOL 252a in the MDKC 200a; however, since the MDKC 200a has failed, the command remains unanswered.

Now the RDKC 200b needs to know whether this situation has occurred due to failure of the MDKC 200a or due to failure in the network 501a. So the RDKC 200b communicates with the quorum storage apparatus 600 and tries to find out whether the MDKC 200a is working fine or not by setting up temp lock in quorum table 6521 in the quorum volume 652. This process is executed by the program to handle remote volume access failure 2413 and the program to find fault type using quorum 2415 for the RKDC 200b. Example flows of these programs are shown in FIG. 24 and FIG. 26 respectively and will be explained later.

After communicating with the quorum storage apparatus 600, the RDKC 200b finds out that the MDKC 200a has showed no response to the temp lock the RDKC 200b has performed, thus the RDKC 200b presumes that the MDKC 200a has failed, so the RDKC 200b sets a FIX lock on the quorum table 6521 indicating that the SVOL 252b will survive and the MDKC 200a should block the PVOL 200a when it comes back alive. The RDKC 200b then changes the pair state to the "Rev-Suspend" state in its pair management table 2421a. The RDKC 200b then writes the data to the SVOL 252b and returns the write completion acknowledgement to the host 100a.

<Process on Quorum Failure>

FIG. 7 shows the processing by the storage system 200 which takes place when a quorum related fault is detected. In the case shown in FIG. 1, the network 502a between the quorum storage apparatus 600 and the storage apparatus 200a has failed. Since both the storage apparatuses 200a and 200b perform the quorum health check (explained using FIG. 28) in timely manner, the storage apparatus 200a detects the loss of communication with the quorum storage apparatus 600 on its next quorum health check after the failure.

The storage apparatus 200a then informs the storage apparatus 200b that it has detected a failure. Now, both the storage apparatuses 200a and 200b change their operation to "Unavailable" mode, and change their pair state according to the pair state transition table 2424 as well.

In this embodiment, for example, before the loss of communication with the quorum storage apparatus 600 occurred, the pair state was the "Pair" state, so the MDKC 200a and the RDKC 200b will change the pair state of the Ha pair volumes 252a, 252b respectively to the "RC-Pair" state in their respective pair management tables 2421a and 2421b.

In the "RC-Pair" state, if a read command is issued to the SVOL 252b, according to the table for I/O process pattern for each pair state 2423 (FIG. 20), for the "RC-Pair" state, the read command to the SVOL 252b is processed by "Remote", i.e. data is read from the PVOL 252a in the MDKC 200a and returned to the host 100a by the RDKC 200b.

If a read command is issued to the PVOL 252a, according to the table for I/O process pattern for each pair state 2423, the read command to the PVOL 252a is processed by "Local", i.e. data is read from the PVOL 252a and returned to the host 100a by the MDKC 200a. All the write commands to the PVOL 252a and to the SVOL 252b continue to be duplicated in both of the volumes 252a, 252b.

In the "Unavailable" mode, in the case of a communication failure between the first and the second storage apparatuses 200a and 200b, the first and the second storage apparatuses 200a and 200b do not use the third storage apparatus 600 to find out the status of other storage apparatus, instead they use predefined rules to decide on the survivor and non-survivor volumes. Also, in the "Unavailable" mode, duplication of write data continues in the first and the second volumes 252a, 252b but a host read command is serviced in such a way that a communication loss between the two storage apparatuses 200a and 200b can be detected promptly and the split brain problem does not occur.

One of the ways to achieve it is to use a timely heartbeat signal between the first and the second storage apparatuses 200a and 200b to check the health of the communication network and of each other (storage apparatuses). If any communication loss occurs, it is detected by not receiving the heartbeat signal within the predefined time duration.

In another way, all the host reads received on either of the two storage apparatuses 200a and 200b are serviced by reading data only from one volume which has been decided to be the survivor volume when switching to "Unavailable" mode. In this way, a communication loss is detected by the storage apparatus having the non-surviving volume when either a host read or host write operation is serviced by that apparatus, thus the "split brain problem" is avoided.

Thus, with this approach, even after the loss of communication with third storage apparatus (in "Unavailable" mode), 1) the data continues to be duplicated in the first and the second storage apparatus and 2) in the case of failure of pre-defined non-survivor volume or the failure of communication link between the first and the second storage apparatuses, the survivor volume continues to process I/O.

When the application 151 wants to read/write some data from/to the volume, it sends the read/write command through the OS 152 and the multipathing software selects a path to transfer the read/write command to the storage apparatus. The multipathing software can choose either path to send the read/write command.

In the case of a write command, in order to make data redundant, the storage apparatus which received write command duplicates the write data to the primary and the secondary volumes. Since both the storage apparatuses can independently receive a write command, data consistency must be maintained by some well known method.

For example in this embodiment, all the write data from the host 100a is first written to the PVOL 252a and then to the SVOL 252b. Thus, the storage apparatus, upon receiving a write command, checks whether its volume is primary or secondary, if it is a primary volume the storage apparatus writes to its volume then sends the write data to other volume in the other storage apparatus. Once the write to secondary volume is completed and acknowledged to the storage apparatus with primary volume, a write completion acknowledgement is sent to the host.

On the other hand if storage apparatus that received the write command finds its volume to be secondary, it sends this data to the primary volume in other storage apparatus and after receiving acknowledge from that other storage system, it writes data to its own volume and then returns the write completion acknowledgement to the host. Incidentally, write data to the storage apparatus of primary volume and the secondary volumes may also be temporarily retained in the cache memories 243 of the respective storage apparatuses 200a and 200b.

In this embodiment, the storage apparatuses 200a and 200b manage the host I/O processing pattern by using state machines which will be explained later using FIG. 8 through FIG. 16. The storage apparatuses 200a and 200b keep record of the status of its volume of the HA volume pair 252. The storage apparatuses 200a and 200b change the pair state of volumes on various events, for example, if the status of a component of information system changes (fails or gets repaired) or the storage administrator gives some command. The two volumes 252a, 252b of the HA pair 252 may not necessarily be in the same pair state.

<State Machines>

FIGS. 8 through 16 show diagrams of state machines (state transition diagrams) concerning the pair state of the HA operation. Each pair state is explained below.

<S1: "SMPL" State>

The "SMPL" state S1 (also called "Simplex" state) is a state where the copy between the PVOL and the SVOL configuring a pair has not started.

Referring to FIG. 8, when the storage administrator issues a command to create a HA pair (E1), the pair state of the HA pair volumes changes to the "Copy" state S2 and the initial data copy from the PVOL to the SVOL starts.

Referring to FIG. 9, when the storage administrator issues a command to create Rev-HA pair (E1), the pair state of the HA pair volumes changes to the "Rev-Copy" state S3 and the initial data copy from the SVOL to the PVOL starts.

<S2: "Copy" State>

The "Copy" state S2 is a state where the initial data copying from the PVOL to the SVOL has started but not finished yet. FIG. 8 shows the pair state transition diagram of the "Copy" state S2.

In the "Copy" state S2, if a PVOL fault (E10) or MDKC fault (E12) occurs, the pair state changes to the "Block" state S10 because the only working volume (PVOL) is no longer available. If a RDKC fault (E13) or inter DKC data path fault (E14) occurs, the pair state changes to the "Suspend" state S8, because the copy can no longer continue. If the initial data copy from the PVOL to the SVOL has finished (E9), the pair state changes to the "Pair" state S4.

If an SVOL fault (E11) occurs, the pair state changes to the "Switch" state S6, because now the copy to the SVOL cannot continue but an I/O command sent to the SVOL can be processed by forwarding it to the PVOL. If the quorum state changes (quorum fault (E15) or quorum repair (E25) occurs), the pair state does not change.

<S3: "Rev-Copy" State>

The "Rev-Copy" state S3 is a state where the initial data copy from the SVOL to the PVOL has started but not finished yet. FIG. 9 shows the pair state transition diagram of the "Rev-Copy" state S3.

In the "Rev-Copy" state S3, if an SVOL fault (E11) or RDKC fault (E13) occurs, the pair state of the PVOL changes to the "Rev-Suspend" state S9, while the pair state of the SVOL changes to the "Block" state S10. If a MDKC fault (E12) or inter DKC data path fault (E14) occurs, the pair state changes to the "Rev-Suspend" state S9, because copy can no longer continue.

If the initial data copy from the SVOL to the PVOL has finished (E9), the pair state changes to the "Pair" state S4 in the Available mode, or the pair state changes to the "RC-Pair" state S5 in the Unavailable mode. If a PVOL fault (E10) occurs, the pair state changes to the "Rev-Switch" state S6, because now the copy to the PVOL cannot continue but an I/O command sent to the PVOL can be processed by forwarding it to the SVOL. If the quorum status changes (quorum fault (E15) or quorum repair (E25) occurs), the pair state does not change.

<S4: "Pair" State>

The "Pair" state S4 is a state where the initial copy has finished, the PVOL and the SVOL are in synchronization and the quorum is available for use in a case where there is a communication loss between the two HA storage apparatus pair. FIG. 10 shows the pair state transition diagram of the "Pair" state.

In the "Pair" state S4, if a PVOL fault (E10) occurs, the pair state changes to the "Rev-Switch" state S7, because an I/O command sent to the PVOL can be processed using the SVOL. If a MDKC fault (E12) occurs, the pair state changes to the "Rev-Suspend" state S9, because neither the PVOL will be able to be accessed nor an I/O command directed to the PVOL can be transferred to the SVOL.

If an inter DKC data path fault (E14) or a RDKC fault (E13) occurs, the pair state changes to the "Suspend" state S8, because the SVOL can no longer continue to be synchronized with the PVOL. If an SVOL fault (E11) occurs, the pair state changes to the "Switch" state S6, because the copy to the SVOL cannot continue but an I/O command sent to the SVOL can be processed using the PVOL. If a quorum fault occurs (E15), the pair state changes to the "RC-Pair" state S5 because the availability of the volume pair can no longer be maintained as high as with the quorum but the SVOL can work as a Remote Copy of the PVOL.

<S5: "RC-Pair" State>

The "RC-Pair" state S5 is a state where the initial copy has finished and the PVOL and the SVOL are in synchronization but the quorum is not available for use ("Unavailable" mode) in a case where there is a communication loss between the two storage apparatuses of the HA storage apparatus pair. FIG. 11 shows the pair state transition diagram of the "RC-Pair" state S5.

In this state, if a PVOL fault occurs (E10), the pair state changes to the "Rev-Switch" state S7, because an I/O command sent to the PVOL can be processed using the SVOL. If the RDKC loses communication with the MDKC (due to MDKC fault or Path fault) (E12/E14), it changes the pair state of its SVOL to the "Block" state S10, because, in the absence of the quorum, the RDKC will not be able to find out whether the communication loss is due to the inter DKC network fault or the MDKC fault. If the MDKC loses communication with the RDKC (due to RDKC fault or Path fault) (E13/E14), it changes the pair state of its PVOL to the "Suspend" state S8.

If an SVOL fault (E11) occurs, the pair state changes to the "Switch" state S6, because the copy to the SVOL cannot continue but an I/O command sent to the SVOL can be processed using the PVOL. If the quorum is repaired (E25), the pair state changes to the "Pair" state S4.

<S6: "Switch" State>

The "Switch" state S6 is a state where the SVOL is unavailable due to some fault but the PVOL, the MDKC, the RDKC are working fine. In this state, an I/O command to the SVOL is transferred to the PVOL and processed, so the host processing does not get affected and it can continue using both the paths (one to the PVOL and another to the SVOL). FIG. 12 shows the pair state transition diagram of the "Switch" state S6.

In this state, if a PVOL fault or an MDKC fault occurs (E10/E12), the pair state changes to the "Block" state S10, because the only working copy of data (PVOL) is no longer available. If the MDKC loses communication with the RDKC (E13/E14), the MDKC changes the pair state of its PVOL to the "Suspend" state S8. If the SVOL fault is repaired and the storage administrator issues a "Resync" command (E7), the pair state changes to the "Copy" state S2. The "Switch" state S6 does not change with the change in the quorum status (quorum fault occurs or quorum is repaired) (E15/E25).

<S7: "Rev-Switch" State>

The "Rev-Switch" state S7 is opposite of the "Switch" state S6. In the "Rev-Switch" state, the PVOL is unavailable due to some fault but the SVOL, the MDKC, the RDKC work fine. In this state, an I/O command to the PVOL is transferred to the SVOL and processed, so the host processing does not get affected and it can continue using both the paths (one to the PVOL and another to the SVOL). FIG. 13 shows the pair state transition diagram of the "Rev-Switch" state.

In this state, if the SVOL fault or RDKC fault occurs (E11/E13), the pair state changes to "Block" S10, because the only working copy of data (SVOL) is no longer available. If the RDKC loses communication with the MDKC (E12/E14), the RDKC changes the pair state of its SVOL to the "Rev-Suspend" state S9. If the PVOL fault is repaired and the storage administrator issues a "Rev-Resync" command (E7), the pair state changes to the "Rev-Copy" state S3. The "Rev-Switch" state S3 does not change with the change in quorum status (quorum fault occurs or quorum is repaired) (E15/E25).

<S8: "Suspend" State>

The "Suspend" state S8 is a state where the MDKC and the RDKC are unable to communicate due to a fault in the network 501, or due to a fault in the RDKC. Apart from the faults, the storage administrator can purposely suspended the volume pair in the "Pair" state by giving a "Suspend" command. In this state, the PVOL continues I/O processing while the SVOL does not. FIG. 14 shows the pair state transition diagram of the "Suspend" state S8.

In this state, if a PVOL fault or an MDKC fault occurs (E10/E12), the pair states of the PVOL and the SVOL are changed to "Block" S10, because the only working copy of data (PVOL) is no longer available. If in the "Suspend" state S8, the network path 501 (or the RDKC) is repaired and the SVOL becomes available for access by the MDKC, the storage administrator can give a "Resync" command (E7) to make the PVOL and the SVOL as mirrored volume pair, so the pair state changes to the "Copy" state S2.

If, in the "Suspend" state S8, the network path 501 is repaired but the SVOL remains in a fault state (E24), the pair state changes to the "Switch" state S6. The "Suspend" state does not change with the change in the quorum status (quorum fault occurs or quorum is repaired) (E15/E25).

<S9: "Rev-Suspend" State>

The "Rev-Suspend" state S9 is a pair state where the SVOL continues I/O processing while the PVOL does not. This state happens for example, when either the PDKC fault has occurred or the storage administrator purposely reverse suspended the volume pair in the "Pair" state S4, by giving a "Rev-Suspend" command. FIG. 15 shows the pair state transition diagram of the "Rev-Suspend" state S9.

In this state, if an SVOL fault or an RDKC fault occurs (E11/E13), the pair state of the SVOL is changed to "Block" S10, because the only working copy of data (SVOL) is no longer available. If, in the "Rev-Suspend" state S9, the network path 501 (or the RDKC) is repaired and the PVOL becomes available for access, the storage administrator can give a "Rev-Resync" command to make the PVOL and SVOL as mirrored volume pair (E7), so the pair state of the PVOL/SVOL is changed to the "Rev-Copy" state S3 and the data from the SVOL is copied to the PVOL.

The "Rev-Suspend" state does not change on change in the state of quorum (E15/E25).

<S10: "Block" State>

The "Block" state S10 is a pair state of a volume of a HA pair, where the storage apparatus presenting the volume stops processing I/O for the volume.

FIG. 16 shows the pair state transition from/to the "Block" state S10, on different events. FIG. 16 shows the pair state transition diagram of the "Block" state S10.

<Table for Quorum Lock Management>

FIG. 17 shows an example of the table for quorum lock management 6521 according to an embodiment. The table for quorum lock management 6521 exists in the logical volume 652 of the third storage apparatus 600.

The table for quorum lock management 6521 has two rows for the two DKCs (the storage apparatuses 200a and 200b), respectively. The first row is for the DKC D2 and the second row is for the DKC D5. For example, the DKC D2 is the storage apparatus 200a and the DKC D5 is the storage apparatus 200b.

These two rows indicate the two DKCs as priority DKCs for the HA volume pairs. In this embodiment, for all the HA PVOLs in the DKC 200a, the priority DKC is 200a, and for all the HA PVOLs in the DKC 200b, the priority DKC is 200b.

Each row includes entries of "Temp Lock" for both the DKCs of the HA DKC pair and "Fix Lock (Winner DKC)". A DKC can set up a Temp Lock by writing "True" to the corresponding "Temp Lock" cell. A DKC can setup Fix Lock by writing its DKC ID in the "Fix Lock (Winner DKC)" cell.

If one of the DKCs fails, the remaining DKC of the HA DKC pair sets up Temp Lock on both the rows, and finally setup a Fix Lock, noticing that the other DKC has not set any lock. So, all the volumes (irrespective of PVOL or SVOL) in the remaining DKC survive and can continue I/O.

If, for example, the inter DKC network fails, both the two DKC set up temp lock, then each can set a Fix lock in the row where it is the priority DKC, so both DKC survive but the only PVOLs of both DKC survive and continue I/O, and all the SVOLs in the both the DKCs are blocked.

<Table for Pair Management>

FIG. 18 shows an example of the table for pair management 2421 according to an embodiment. The table for pair management 2421 has one entry for each HA volume pair, including entries of "Own Vol ID" the volume ID of own volume (volume of the DKC in which the table exists) of the HA pair, "Own Vol Type" own volume's role in the pair (PVOL or SVOL), "Pair DKC ID", "Pair Vol ID", "Pair Vol Status" and "Pair State".

<Table for Current Status of Common Components>

FIG. 19 shows an example of the table for current status of common components 2422 according to an embodiment of present invention. The table for current status of common components 2422 has only one entry about the status of the components that are common for a group of HA volume pairs.

Namely, the table for current status of common components 2422 manages the status of "Own DKC", "Pair DKC", "Inter DKC path" the network between the two storage apparatus 200a and 200b, "Own Quorum", "Pair DKC's Quorum". The table for current status of common components 2422 also contains entry for the Quorum mode because the Quorum mode is also common for HA pair volumes of the storage apparatus 200a and 200b.

<Table for I/O Process Pattern in Each Pair State>

FIG. 20 shows an example of the table for I/O process pattern in each pair state 2423 according to an embodiment. The table for I/O process pattern in pair each pair state 2423 is a read only table and the program for host write processing 2411 and the program for host read processing 2412 read it to decide how a write/read command directed to a volume is processed in the current pair state of the volume.

The table for I/O process pattern in each pair state 2423 has entries for process pattern for "Host Read" and "Host Write" commands for the PVOL and the SVOL for each possible pair state. The entries can be either of "Local", "Remote", "Duplicate" or "No".

The entry "Local" means that the I/O process must be performed using the volume existing in the storage apparatus to which the I/O command has been issued. The entry "Remote" means that the I/O must be processed using the remote volume existing in the pair storage apparatus. The entry "No" means that the I/O command cannot be processed. The entry "Duplicate" is only for write command, and it means that the data must be written to both the volumes (PVOL and SVOL) of the HA pair.

<Table for Pair State Transition on Single Component Fault>

FIG. 21 shows an example of table for pair transition on single component fault 2424 according to an embodiment. The table for pair transition on single component fault 2424 is a read only table and the programs that change the states of volume pairs on a failure of a component of the information system, read this table and decide for the new state of the HA volume pair(s).

The table for pair transition on single component fault 2424 has entries of new pair state for each single component fault in each pair state. The table for pair transition on single component fault 2424 is mainly used by programs that change the volume pair states, e.g., the program to change pair state on given component fault 2414 and the program to change quorum mode and pair state on change in quorum status 2417.

The way to read the table for pair transition on single component fault 2424 is explained here with the help of an example situation. In this example, for the volume pair 252, the current pair state is "Pair" and the storage apparatus 200a detects loss of communication with the quorum storage apparatus 600 due to a fault in the network 502 as shown in FIG. 1 or (or due to failure of quorum storage apparatus 600 itself). The storage apparatus 200a reads the cell in the row "Pair" and the column "Quorum fault", which is "RC-Pair", so the storage apparatus 200a changes the pair state of the volume 252a to the "RC-Pair" state.

<Program for Host Write Processing (for PVOL)>

FIG. 22A is a flowchart showing an operation of the program for host write processing 2411 when the storage apparatus receives a write command from the host 100a. The program for host write processing 2411 is executed by both the storage apparatuses 200a and 200b. For ease of explanation, in this example, the storage apparatus 200a receives a host write command.

At Step S100, the storage apparatus 200a receives a write command from the host 100a and extracts the volume ID from the command.

At Step S101, the storage apparatus 200a reads the volume ID from the command and reads the table for pair management 2421 to determine whether the write target volume is a PVOL or an SVOL. The storage apparatus 200a executes Step S120 if it is an SVOL, or executes Step S102 if it is a PVOL.

At Step S102, the storage apparatus 200a uses the volume ID to determine the state of the volume pair by reading the table for pair management 2421. The storage apparatus 200a reads the table for I/O process pattern in each pair state 2423 to find out the host write pattern for the PVOL in the determined state.

The storage apparatus 200a executes Step S106 if the "Host Write" for the PVOL is "Remote", executes Step S103 if the "Host Write" for the PVOL is "Local" or "Duplicate", or executes Step S113 if the "Host Write" for the PVOL is "No".

At Step S103, the storage apparatus 200a writes the write data to the PVOL.

At Step S104, the storage apparatus 200a reads the table for I/O process pattern in each pair state 2423 to find out whether "Host write" for the PVOL is "Duplicate" in the state. The storage apparatus 200a executes Step S106 if "Host write" for the PVOL is "Duplicate" in the state, or executes step S105 if "Host Write" for the PVOL is some other pattern.

At Step S105, the storage apparatus 200a returns the write completion acknowledgement to the host 100a and the program for host write processing 2411 ends.

At Step S106, the storage apparatus 200a reads pair management table and gets the storage apparatus ID where the SVOL of the HA pair exists and sends the write command to the SVOL in the storage apparatus (in this example, to the storage apparatus 200b).

At Step S107, the storage apparatus 200a waits for the reply to the write command sent in step S106 from the storage apparatus 200b, executes Step S110 if the write completion acknowledgement is received, executes Step S108 if no reply is received within a specific timeout duration, or executes Step S111 if a write error message is received.

At Step S108, when no reply is received from the storage apparatus 200b, the storage apparatus 200a executes the program to handle remote volume access failure 2413 to analyze the failure if possible and changes the pair state if required.

At Step S109, the storage apparatus 200a returns the write completion acknowledgement to the host 100a, and the program for host write processing 2411 ends.

At Step S110, the storage apparatus 200a returns the write completion acknowledgement to the host 100a. At Step S111, the storage apparatus 200a executes the program to change pair state on given component fault 2414 with the parameter of the SVOL.

At Step S112, the storage apparatus 200a returns the write completion acknowledgement to the host 100a and the program for host write processing 2411 ends.

At Step S113, the storage apparatus 200a returns the error message to the host 100a and the program for host write processing 2411 ends.

<Program for Host Write Processing (for SVOL)>

Referring to FIG. 22B, at Step S120, the storage apparatus 200a uses the volume ID to determine the state of the volume pair by reading the table for pair management 2421 and reads the table for I/O process pattern in each pair state 2423 to find out the write pattern for the SVOL in the determined state. The storage apparatus 200a executes Step S121 if "Host Write" for the SVOL is "Local", executes Step S123 if "Host Write" for the SVOL is "Remote" or "Duplicate", or executes Step S132 if "Host Write" for the SVOL is "No".

At Step S121, the storage apparatus 200a writes the write data to the SVOL.

At Step S122, the storage apparatus 200a returns the write completion acknowledgement to host 100a.

At Step S123, the storage apparatus 200a, reads the table for pair management 2421 and gets the storage apparatus ID where the PVOL of the HA pair exists and sends the host write command to the PVOL in the storage apparatus (in this example, to the storage apparatus 200b).

At Step S124, the storage apparatus 200a waits for the reply to the write command sent in Step S123 from the storage apparatus 200b. The storage apparatus 200a executes Step S125 if the write completion acknowledgement is received. The storage apparatus 200a executes Step S128 if no reply is received within a specific timeout duration. The storage apparatus 200a executes Step S130 if the write error message is received.

At Step S125, the storage apparatus 200a reads the table for I/O process pattern in each pair state 2423 to find out whether "Host Write" for SVOL is "Duplicate" in the state. The storage apparatus 200a executes Step S126 if "Host Write" for the SVOL is "Duplicate" in the state. The storage apparatus 200a executes Step S127 if "Host Write" for the SVOL is some other pattern.

At Step S126, the storage apparatus 200a writes the write data to the SVOL.

At Step S127, the storage apparatus 200a returns the write completion acknowledgement to the host 100a and the program for host write processing 2411 ends.

At Step S128, the storage apparatus 200a executes the program to handle remote volume access failure 2413 to analyze the failure if possible and changes the pair state if required.

At Step S129, the storage apparatus 200a returns the write completion acknowledgement to the host 100a and the program for host write processing 2411 ends. At Step S130, when the write error message is received from the storage apparatus 200b, the storage apparatus 200a executes the program to change pair state on given component fault 2414 with parameter of the PVOL.

At Step S131, the storage apparatus 200a returns the write completion acknowledgement to the host 100a and the program for host write processing 2411 ends. At Step S132, the storage apparatus 200a returns a write error message to the host 100a and the program for host write processing 2411 ends.

<Program for Host Read Processing (for PVOL)>

FIG. 23 is a flowchart showing an operation of the program for host read processing 2412 when a storage apparatus receives a read command from the host 100a. The program for host read processing 2412 is executed by both the storage apparatuses 200a and 200b. For the ease of discussion, a case where a host read command is received at the storage apparatus 200a is explained in this example.

At Step S200, the storage apparatus 200a receives a read command from the host 100a and extracts the volume ID from the command.

At Step S201, the storage apparatus 200a uses the volume ID to determine whether the volume is a PVOL or an SVOL and the state of the volume pair by reading the table for pair management 2421. The storage apparatus 200a reads the table for I/O process pattern in each pair state 2423 to find out the host read pattern for the given volume type in the determined state. The storage apparatus 200a executes Step S202 if "Host Read" is "Local", executes Step S204 if "Host Read" is "Remote", or executes Step S202 if "Host Read" is "No".

At Step S202, the storage apparatus 200a reads the data from its own volume.

At Step S203, the storage apparatus 200a returns the read data to the host 100a and the program for host read processing 2412 ends.

At Step S204, the storage apparatus 200a reads the table for pair management 2421 and gets the storage apparatus ID where the other volume of the HA pair exists and sends the read command to the other volume in the storage apparatus (in this example, to the storage apparatus 200b).

At Step S205, the storage apparatus 200a waits for the reply to the read command sent in Step S204 from the storage apparatus 200b. The storage apparatus 200a executes Step S208 if the read data is successfully received. The storage apparatus 200a executes Step S206 if no reply is received within a specific timeout duration. The storage apparatus 200a executes Step S209 if a read error message is received.

At Step S206, when no reply is received from the storage apparatus 200b, the storage apparatus 200a executes the program to handle remote volume access fault 2413, to analyze the failure type if possible and changes the pair state if required.

At Step S207, the storage apparatus 200a returns a read error message to the host 100a and the program for host read processing 2412 ends At Step S208, the storage apparatus 200a returns the read data to the host 100a and the program for host read processing 2412 ends.

At Step S209, the storage apparatus 200a executes the program to change pair state on given element fault 2414 with a parameter of the remote volume.

At Step S210, the storage apparatus 200a returns a read error message to the host 100a and the program for host read processing 2412 ends At Step S211, the storage apparatus 200a returns a read error message to the host 100a and the program for host read processing 2412 ends <Program to Handle Remote Volume Access Failure>

FIG. 24 is a flowchart showing an operation of the program to handle remote volume access failure 2413. The program to handle remote volume access failure 2413 is executed by both the storage apparatuses 200*a* and 200*b*. In the example described below, it is assumed that the program to handle remote volume access failure 2413 is executed by the storage apparatus 200*a*.

At Step S300, the storage apparatus 200*a* reads the table for current status of common components 2422 and checks whether the HA mode is "Available" or not. The storage apparatus 200*a* executes Step S303 if the mode is "Available". The storage apparatus 200*a* executes Step S301 if the mode is not "Available".

At Step S301, the storage apparatus 200*a* waits for a specific time duration so that, if possible, the pair DKC 200*b* can also detect the loss in the communication with the storage apparatus.

At Step S302, when the quorum storage apparatus 600 is not available to help find whether the fault is due to the inter DKC path connection or because of the opposite DKC fault, the storage apparatus 200*a* recognizes the fault as "Path Fault" and calls the program to change pair state on given component fault 2414 with "Path" as the argument to the program.

At Step S303, the storage apparatus 200*a* checks whether the quorum storage apparatus 600 is online (working fine) currently or not, for example by using SCSI Inquiry command. The storage apparatus 200*a* executes Step S306 if the quorum storage apparatus 600 is online. The storage apparatus 200*a* executes Step S304 if the quorum storage apparatus 600 is not online or there is communication loss with the quorum storage apparatus 600.

At Step S304, with the loss of communication with the quorum storage apparatus 600, the storage apparatus 200*a*, which has just lost communication with its pair storage apparatus 200*b*, could not know whether the communication is lost due to the inter DKC path fault or due to a fault in the other storage apparatus 200*b*.

Since the Quorum mode was "Available" mode when the communication loss occurred, the pair storage apparatus 200*b* (if working fine) might not have lost communication with the quorum storage apparatus 600 and the volumes might have kept themselves alive by getting fix lock on the quorum storage apparatus 600.

Thus, in order to prevent the split brain problem, the storage apparatus 200*a* sets "Fault" in "Own Quorum" and "Inter DKC Path" in the table for current status of common components 2422, and then at Step S305, the storage apparatus 200*a* changes the pair states of all the affected volume pairs to the "Block" state in the table for the pair management 2421.

At Step S306, the storage apparatus 200*a* calls the program to find fault type using quorum 2415 to find the type of fault by communicating with the quorum storage apparatus 600 and change the pair state in the table for the pair management 2421 accordingly.

<Program to Change Pair State on Element Fault>

FIG. 25 is a flowchart showing the operation of the program to change pair state on given component fault 2414. The program to change pair state on given component fault 2414 changes the pair state when a fault occurs in a component of the information system. The fault is detected by other programs. The program to change pair state on given component fault 2414 takes the fault type from another program as the parameter and changes the pair state.

At Step S401, the program to change pair state on given component fault 2414 receives faulty component information from the caller program. The faulty component may be either of "VOL", "DKC", or "Inter DKC Path".

At Step S402, the program to change pair state on given component fault 2414 analyzes the received information and checks whether the faulty component is "VOL" or the some other component. The program to change pair state on given component fault 2414 executes Step S405 if the faulty component is "VOL". The program to change pair state on given component fault 2414 executes Step S403 if the faulty component is other than "VOL".

At Step S403, the program to change pair state on given component fault 2414 uses the ID of the faulty component to find and update the faulty component status to "Fault" in the table for current status of common components 2422.

At Step S404, the program to change pair state on given component fault 2414 acquires the current pair state of each pair from the table for pair management 2421 and refers to the table for pair state transition on single component fault 2424 to find out the new state corresponding to the current state on the component fault received in Step S401.

At Step S405, the program to change pair state on given component fault 2414 updates the table for pair management 2421 with the "PVOL" or the "SVOL" status as "Fault", depending on the Vol ID.

At Step S406, the program to change pair state on given component fault 2414 refers to the table for pair state transition on single component fault 2424 and changes the affected volume's pair state in the table for pair management 2421.

<Process to Change Pair State on Two Point Fault (Including Quorum Fault)>

FIG. 26 is a flowchart showing an operation of the program to change pair state on given component fault 2414 when two point faults occur simultaneously. One of faults is a quorum fault and the other can be either an inter-DKC path fault or a DKC fault. The faults are detected by other programs.

The program to change pair state on given component fault 2414 changes the pair state to "Block" state, because the storage apparatus that lost communication with other storage apparatus, could not know whether the communication is lost due to an inter DKC path fault or due to a fault in the other storage apparatus.

Since the quorum mode was "Available" mode in the table for current status of common components 2422 when the communication loss occurred, the other storage apparatus is working fine. The other storage apparatus might not have lost communication with the quorum storage apparatus 600 and might have kept itself alive by getting the quorum information. Thus, in order to prevent the split brain problem, the program to change pair state on given component fault 2414 blocks its volume by setting the volume pair state to the "Block" state.

At Step S501, the program to change pair state on given component fault 2414 sets "Fault" in "Own Quorum" and "Inter DKC Path" in the table for current status of common components 2422.

At Step S502, the program to change pair state on given component fault 2414 changes the pair state of all the affected volume pairs to "Block" state in the table for pair management 2421.

<Program to Find Fault Type Using Quorum (for a Priority DKC)>

FIG. 26 is a diagram showing an operation of the program to find fault type using quorum 2415 to determine, in the case of communication loss between the two storage apparatuses 200*a* and 200*b*, whether the fault is in the inter DKC communication path or in a storage apparatus, and to change the state of HA pairs in the storage system according to the fault.

At Step S601, the program to find fault type using quorum 2415 finds out whether the storage apparatus executing the program 2415 is a Priority DKC or a Non-priority DKC by referring to the "Priority DKC ID" column in the table for quorum lock management 6521. The program to find fault type using quorum 2415 executes Step S602 if the storage apparatus is the priority DKC, or executes Step S621 if the storage apparatus is the non-priority DKC.

At Step S602, the program to find fault type using quorum 2415 communicates with the quorum storage apparatus 600 and finds out whether the Non-Priority DKC has already set up any lock on the table for quorum lock management 6521.

The program to find fault type using quorum 2415 executes Step S603 if the Non-Priority DKC has set up a Fix lock on the table for quorum lock management 6521, executes Step S604 if the Non-Priority DKC has set up a temporary lock on the table for quorum lock management 6521, or executes Step S607 if the Non-Priority DKC has not set up any lock on the table for quorum lock management 6521.

At Step S603, the Non-Priority DKC setting up a Fix lock means that due to some unknown reasons (or some fault), the Non-Priority DKC has assumed that the Priority DKC has become non-functional and the Non-Priority DKC should keep itself alive. So the Priority DKC (the program 2415) take steps to make sure this situation is maintained and there is no confusion that can result in the split brain problem. The program to find fault type using quorum 2415 calls the program to change pair state on given component fault and provides it with the information of the "Priority DKC" as a parameter.

At Step S604, that the Non-Priority DKC has set up a temporary lock on quorum means that the Non-priority DKC also detected a communication loss and wanted to know the status of the Priority DKC. The priority DKC (the program 2415) then sets up a temporary lock on the table for quorum lock management 6521 to let the Non-Priority DKC know that the Priority DKC is functional.

At Step S605, the program to find fault type using quorum 2415 waits for the quorum health check timeout duration to ensure that the Non-priority DKC reads the temp lock of the Priority DKC.

At Step S606, the program to find fault type using quorum 2415 now sets up a Fix lock on the table for quorum lock management 6521, indicating that the Priority DKC survives.

At Step S607, since the Non-priority DKC has not set up a temporary lock on the table for quorum lock management 6521, the program to find fault type using quorum 2415 decides that the Non-priority DKC is working fine and the fault resulting in communication loss is because of a fault in the inter DKC communication path. So, the program to find fault type using quorum 2415 calls the program to change pair state on given component fault and provides it with the information of the "Path" as a parameter At Step S608, the program to find fault type using quorum 2415 sets up a temporary lock on the table for quorum lock management 6521 to let the Non-Priority DKC know that the Priority DKC is functional.

At Step S609, the program to find fault type using quorum 2415 waits for the quorum health check timeout duration to ensure that the Non-priority DKC reads the temp lock of the Priority DKC.

At Step S610, the program to find fault type using quorum 2415 communicates with the quorum storage apparatus 600 and finds out whether the Non-Priority DKC has set up a temp lock on the table for quorum lock management 6521. The program to find fault type using quorum 2415 executes Step S606 if the Non-Priority DKC has set up a temporary lock on the table for quorum lock management 6521, or executes Step S611 if the Non-Priority DKC has not set up any lock on the table for quorum lock management 6521.

At Step S611, the program to find fault type using quorum 2415 now sets up a Fix lock on the table for quorum lock management 6521, indicating that the Priority DKC survives.

At Step S612, since the Non-priority DKC has not set up temporary lock on quorum, the program to find fault type using quorum 2415 decides that the Non-priority DKC is not functional, resulting in the communication loss with the Non-Priority DKC. So the program to find fault type using quorum 2415 calls the program to change pair state on given component fault and provides it with the information of the "Non-Priority DKC" as a parameter.

<Program to Find Fault Type Using Quorum (for a Non-Priority DKC)>

Referring to FIG. 27, an operation of the program to find fault type using quorum 2415 executed by a Non-Priority DKC will be explained. At Step S621, the program to find fault type using quorum 2415 communicates with the quorum storage apparatus 600 and checks whether the Priority DKC has set a fix lock on the table for quorum lock management 6521. The program to find fault type using quorum 2415 executes Step S622 if the Priority DKC has not set up a fix lock, or executes Step S629 if the Priority DKC has set up a fix lock.

At Step S622, the program to find fault type using quorum 2415 sets up a temp lock on the table for quorum lock management 6521 to let the Priority DKC know that the Non-priority DKC is functional.

At Step S623, the program to find fault type using quorum 2415 waits for the quorum health check timeout duration to ensure that the Priority DKC reads the temp lock of the Non-Priority DKC.

At Step S624, the program to find fault type using quorum 2415 communicates with the quorum storage apparatus 600 and checks whether the Priority DKC has set any lock on the table for quorum lock management 6521. The program to find fault type using quorum 2415 executes Step S625 if the Priority DKC has not set up a lock, or executes Step S627 if the Priority DKC has set up a lock.

At Step S611, the program to find fault type using quorum 2415 now sets up a Fix lock on the table for quorum lock management 6521, indicating that the Non-Priority DKC survives.

At Step S626, since the Priority DKC has not set up any lock on the table for quorum lock management 6521, the program to find fault type using quorum 2415 decides that the Priority DKC is non functional, resulting in the communication loss with Priority DKC. So the program to find fault type using quorum 2415 calls the program to change pair state on given component fault and provides it with the information of the "Priority DKC" as a parameter.

At Step S627, on finding that the Priority DKC has set up a lock, the program to find fault type using quorum 2415 decides that the Priority DKC is functional and the communication loss was due to an inter DKC path fault. Now, the program to find fault type using quorum 2415 removes its lock from the table for quorum lock management 6521 and let the Priority DKC survive.

At Step S628, the program to find fault type using quorum 2415 calls the program to change pair state on given component fault and provides it with the information of the "Path" as a parameter.

At Step S629, since the Priority DKC has set up a fix lock, the program to find fault type using quorum 2415 decides that the Priority DKC is functional and the communication loss was due to an inter DKC path fault. However, because the Non-Priority DKC has never set up a lock, the Priority DKC might be working as if the Non-Priority DKC is not functional. So in order to avoid confusion, the program to find fault type using quorum 2415 decides to maintain such pair state and calls the program to change pair state on given component fault and provides it with the information of the "Non-Priority DKC" as a parameter.

<Program for Quorum Health Check>

FIG. 28 is a flowchart showing an operation of the program for quorum health check 2416. The program for quorum health check 2416 is run by each storage apparatus (200a and 200b) after each of the "Health check timeout" durations.

At Step S700, the program for quorum health check 2416 communicates with the quorum storage apparatus 600 and checks whether the quorum storage apparatus 600 is online or not. The program for quorum health check 2416 executes Step S701 if the quorum storage apparatus 600 is not online, or executes Step S702 if the quorum storage apparatus 600 is online.

At Step S701, the program for quorum health check 2416 refers to the table for current status of common components 2422 and checks the status in the "Own Quorum" column. If the current own quorum status (current status in the "Own Quorum" column) is "Fault", the program for quorum health check 2416 ends because the quorum fault was already detected, appropriate action has already been taken, and the quorum fault has not been repaired yet. If the current own quorum status is "Good", the program for quorum health check 2416 executes Step S702 because there is a fault in communication with the quorum storage apparatus 600 and appropriate action must be taken.

At Step S702, the program for quorum health check 2416 changes the status of in the "Own Quorum" column to "Fault" in the table for current status of common components 2422.

At Step S703, the program for quorum health check 2416 informs the pair DKC about the quorum fault that has occurred, so that the pair DKC can also change its quorum mode (if required), and both the DKC have the same quorum mode. The process of the pair DKC will be described later referring to FIG. 30.

At Step S704, the program for quorum health check 2416 calls the program to change quorum mode and pair state on change in quorum status 2417, because on detecting a fault in the quorum communication, the quorum mode as well as the states of volume pairs may require change.

At Step S705, the program for quorum health check 2416 refers to the table for current status of common components 2422 and checks the current status in the "Own Quorum" column. If the current own quorum status is "Good", the program for quorum health check 2416 skips Steps S706 to S708 because the quorum is working fine and there is no change in the status of the quorum (quorum storage apparatus 600). If the current own quorum status is "Fault", the program for quorum health check 2416 executes Step S706 because the fault which existed earlier in the communication with the quorum storage apparatus 600 has now been repaired and appropriate action must be taken.

At Step S706, the program for quorum health check 2416 changes the status in the "Own Quorum" column to "Good" in the table for current status of common components 2422.

At Step S707, the program for quorum health check 2416 informs its pair DKC about quorum repair, so that the pair DKC can also change its quorum mode (if required), and both the DKC have same quorum mode. The process of the pair DKC will be described later referring to FIG. 30.

At Step S708, the program for quorum health check 2416 calls the program to change quorum mode and pair state on change in quorum status 2417 because on detecting repair of quorum, the quorum mode as well as the states of volume pairs may require change.

At Step S709, the program for quorum health check 2416 checks whether the quorum is locked by its pair DKC in order to check for a potential inter DKC path fault that its pair DKC might have detected. If the quorum is locked by pair DKC, the program for quorum health check 2416 executes Step S710. If the pair DKC has not locked quorum, the program for quorum health check 2416 ends.

At Step S710, finding the quorum locked by the pair DKC means that the pair DKC has detected a communication loss and wants to know if the DKC is functional or not. So the program for quorum health check 2416 calls the program to find fault type using quorum 2415 to find the type of fault and change the pair state accordingly.

<Program to Change Quorum Mode and Pair State on Quorum Status Change>

FIG. 29 is a flowchart showing an operation of program to change quorum mode and pair state on change in quorum state 2417.

At Step S800, the program to change quorum mode and pair state on change in quorum state 2417 refers to the table for current status of common components 2422 to find out the current quorum mode. The program to change quorum mode and pair state on change in quorum state 2417 executes Step S801 if the current quorum mode in the "Quorum Mode" column is "Unavailable", or executes Step S804 if the current quorum mode in the "Quorum Mode" column is "Available".

At Step S801, the program to change quorum mode and pair state on change in quorum state 2417 refers to the table for current status of common components 2422 and checks whether the status of its own quorum and the status of the pair DKC's quorum are both "Good" or not. If both the statuses are "Good", it means that the quorum mode which was "Unavailable" is no longer valid, because both the DKCs can communicate with the quorum storage apparatus. So the program to change quorum mode and pair state on change in quorum state 2417 executes Step S802. If either (or both) of the quorum statuses is "Fault", the quorum mode cannot be changed to "Available" and the program to change quorum mode and pair state on change in quorum state 2417 ends.

At Step S802, the program to change quorum mode and pair state on change in quorum state 2417 changes current mode in the "Quorum Mode" column to "Available" in the table for current status of common components 2422.

At Step S803, the program to change quorum mode and pair state on change in quorum state 2417 refers to the table for pair state transition on single component fault 2424 and changes the pair states of all affected volume pairs by the quorum repair in the table for pair management 2421.

At Step S804, the program to change quorum mode and pair state on change in quorum state 2417 refers to the table for current status of common components 2422 and checks whether the status of its own quorum and the status of the pair DKC's quorum are both "Good" or not. If either (or both) of the quorum statuses is not "Good", it means that the quorum mode which was "Available" is no longer valid, because either (or both) of the DKCs cannot communicate with the quorum storage apparatus due to some fault. Thus, the program to change quorum mode and pair state on change in quorum state 2417 executes Step S805. If both of the quorum statuses are "Good", the quorum mode will continue to be "Available" and the program to change quorum mode and pair state on change in quorum state 2417 ends.

At Step S805, the program to change quorum mode and pair state on change in quorum state 2417 changes the current quorum mode in the "Quorum Mode" column to "Available" in the table for current status of common components 2422.

At Step S806, the program to change quorum mode and pair state on change in quorum state 2417 refers to the table for pair state transition on single component fault 2424 and changes the pair states of all affected volume pairs by the quorum repair in the table for pair management 2421.

<Program to Change Quorum Mode on Receiving Information of Change in Quorum Status>

FIG. 30 is a flowchart showing an operation of the program to change quorum mode on receiving information of change in quorum status 2418 to change the quorum mode based on the information from the pair DKC. The information tells the receiver DKC about the status of the pair DKC's quorum, and the receiver DKC updates its information as well as changing the quorum mode if required. As an example, a case where the storage apparatus 200*b* receives the information from the storage apparatus 200*a* will be explained.

At Step S900, the storage apparatus 200*b* receives the information about the quorum status as observed by the storage apparatus 200*a*.

At Step S901, the storage apparatus 200*b* changes the status of pair DKC's quorum in the table for current status of common components 2422, according to the received information.

At Step S902, the storage apparatus 200*b* calls the program to change quorum mode and pair state on quorum status change 2417, to make the changes in the quorum mode and the states of volume pairs in the event of the quorum mode change.

<Another Embodiment>
<Configuration of Information System>

FIG. 31 shows a logical diagram of the information system used in this embodiment. The physical configuration of the components may be the same as in the first embodiment, explained earlier using FIG. 3.

The configuration of the CM-PK 240 may be also the same as in the first embodiment. This embodiment uses the program to receive heart beat signal and handle fault 2419 along with the programs 2411 through 2418 as used in the first embodiment and shown in FIG. 4. The explanation of programs 2411 through 2418 are the same as explained using FIG. 22A through FIG. 30. An example flowchart of the program to receive heart beat signal and handle fault 2419 is shown in FIG. 33 and explained later.

This embodiment also uses tables 2421 through 2424 as shown in FIG. 4, and explanation of which are provided earlier using FIG. 17 through FIG. 21, except for minor change in the table for I/O process pattern in each pair state 2423 explained below.

<Overview of Present Embodiment>

In this embodiment, in the RC-Pair state, a host read command to the SVOL 252*b* in the storage apparatus 200*b* is processed using the local SVOL 252*b*, hence in this embodiment, in the table for I/O process pattern in each pair state 2423, the cell of RC-Pair state for "Host Read" for SVOL is "Local" instead of "Remote".

In this embodiment, a heartbeat signal generated and transmitted by both storage apparatuses 200*a* and 200*b* at regular intervals. The communication network 501 used to read and write data between the two storage apparatuses 200*a* and 200*b* is also used for the heartbeat signal. The implementation of the heartbeat signal between two computer devices is well known.

For example, the heartbeat signal may be a predefined set of data or a pattern of signal generated in timely manner by both storage apparatuses 200*a* and 200*b*, and sent to each other after the predefined time duration. For example, if the heartbeat signal generated by the storage apparatus 200*b* is received by the storage apparatus 200*a*, the storage apparatus 200*a* assumes that the communication network 501*a* is working good as well as the storage apparatus 200*b*. Similarly, the storage apparatus 200*b* also confirms the status of the communication network 501*b* and the storage apparatus 200*a* by receiving the heartbeat signal sent by the storage apparatus 200*a*.

The heartbeat signal can be used in the normal case together with the quorum health check or it can be used after a loss of communication between the quorum storage apparatus 600 and at least one of the storage apparatuses 200*a* and 200*b*. In this embodiment, the heartbeat signal is used together with the quorum health check.

With heartbeat signal, if the network 501 fails, this fault is detected by both the storage apparatuses 200*a* and 200*b* within a specific time duration when the heartbeat signal is not received by either DKC. Both the DKCs then take appropriate steps to make sure that only one volume of the two volumes of a HA pair survive and the other one is blocked. Thus, the split brain problem does not occur.

The heartbeat signal is especially useful in the case of communication loss between the quorum storage apparatus 600 and the storage apparatus 200*a*, as shown in FIG. 2. This loss in communication with quorum storage apparatus 600 is detected in the next quorum health check (the program for quorum health check 2416) by the storage apparatus 200*a*. On detecting the fault, the storage apparatuses 200*a* and 200*b* change the current quorum mode to "Unavailable" (the program to change quorum mode and pair state on change in quorum status 2417, the program to change quorum mode on receiving information of change in quorum status 2418). The storage apparatuses 200*a* and 200*b* change the pair states of pair volumes on quorum fault (the program to change pair state on given component fault 2414).

Now in the "Unavailable" mode, if the network 501 fails, and the storage apparatus 200*a* detects this failure first, while processing a host write command to volume 252*a* (Program 2411), but there is no way for the storage apparatus 200*a* to know that the pair storage apparatus 200*b* is aware of this network fault. However, with the heartbeat signals being sent and received between the two storage apparatuses 200*a* and 200*b*, the storage apparatus 200*a* can make sure that with the fault in network 501, the storage apparatus 200*b* is not receiving the heartbeat signal and is aware of the fault in the network 501.

Similar to the first embodiment, in this embodiment, the host write data is duplicated even in the "Unavailable" mode. Also, in the "Unavailable" mode, since the split brain problem is avoided by using the heartbeat signal, the processing of read commands using the volumes that are local to the storage apparatuses 200a and 200b is possible. In this embodiment, in the table for I/O process pattern in each pair state 2423 (shown in FIG. 20) the cell of "RC-Pair" state for "Host Read" for SVOL is "Local" instead of "Remote" as in the first embodiment.

This embodiment also has the same pair states as in the first embodiment and the transition of states occur in the same way.

<Program to Receive Heartbeat Signal and Change Pair State on Fault Detection>

FIG. 32 is an example flowchart showing an operation of the program to receive heart beat signal and handle fault 2419. The program to receive heart beat signal and handle fault 2419 timely checks whether a new heartbeat signal has been received from the pair DKC or not. If the signal is not received, the program to receive heart beat signal and handle fault 2419 calls the program to handle remote volume access failure 2413.

At Step S1000, the program to receive heart beat signal and handle fault 2419 generates a predefined heartbeat signal and transmits it to the pair DKC.

At Step S1001, the program to receive heart beat signal and handle fault 2419 waits for a predefined time duration before moving to Step S1002. This time duration is defined to be the same or greater than the time interval between the two heartbeat signals generated by the pair DKC.

At Step S1002, the program to receive heart beat signal and handle fault 2419 checks whether the DKC has received at least one new heartbeat signal sent by the pair DKC since the last time this program checked. If yes, the program to receive heart beat signal and handle fault 2419 assumes that the communication network 501, as well as the pair DKC is working fine and the program goes back to Step S1000. If no, the program to receive heart beat signal and handle fault 2419 executes Step S1003.

At Step S1003, the program to receive heart beat signal and handle fault 2419 calls the program to handle remote volume access failure 2413, which, depending on the quorum mode, either uses the quorum to find out the type of fault or decides that a communication fault has occurred and changes the state of HA volume pairs accordingly.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

The invention claimed is:

1. An information storage system for improving reliability, comprising:
   a first storage apparatus that includes a storage device and a hardware processor operatively coupled with the storage device configured to provide a first logical volume;
   a second storage apparatus that includes a storage device and a hardware processor operatively coupled with the storage device configured to provide a second logical volume; and
   a quorum accessed from the first storage apparatus and the second storage apparatus and including information regarding states of the first storage apparatus and the second storage apparatus,
   wherein the hardware processor of the first storage apparatus and the hardware processor of the second storage apparatus are configured to make a host recognize the first logical volume of the storage device in the first storage apparatus and the second logical volume of the storage device in the second storage apparatus as a single volume,
   wherein the first storage apparatus is configured to read, by the hardware processor, first data from the first logical volume and send the first data to the host upon receiving a read command to the single volume sent from the host,
   wherein the second storage apparatus is configured to read, by the hardware processor, second data from the second logical volume and send the second data to the host upon receiving a read command to the single volume sent from the host,
   wherein the hardware processor of the first storage apparatus is configured to, upon receiving a write command to the single volume sent from the host, write data to the first logical volume and the second logical volume,
   wherein the hardware processor of the second storage apparatus is configured to, upon receiving a write command to the single volume sent from the host, write data to the first logical volume and the second logical volume, and
   wherein, after detecting communication failure with the quorum, the hardware processors of the first storage apparatus and the second storage apparatus are configured to halt use of the quorum and change a state from Pair state to RC-pair state,
   wherein, the hardware processor of the first storage apparatus is configured to, upon receiving a write command to the single volume sent from the host, write data to the first logical volume and the second logical volume in the RC-pair state,
   wherein, after detecting communication failure between the first storage apparatus and the second storage apparatus in the Pair state, either the hardware processor of the first storage apparatus or the hardware processor of the second storage apparatus is configured to continue I/O processing according to the information in the quorum, and
   wherein, after detecting communication failure between the first storage apparatus and the second storage apparatus in the RC-Pair state, the hardware processor of the first storage apparatus is configured to continue I/O processing if possible, and the hardware processor of the second storage apparatus is configured to halt I/O processing.

2. The information storage system according to claim 1, wherein the hardware processor of the second storage apparatus is configured to check the communication with the first storage apparatus for failure before responding to the host for a read command received from the host by transferring the read command to the first storage apparatus to obtain read data for the read command.

3. The information storage system according to claim 1, wherein the hardware processor of the second storage apparatus is configured to check the communication with the first storage apparatus for failure by transmitting and receiving heart beat signals to and from the first storage apparatus.

4. The information storage system according to claim 1, wherein, in the RC-pair state, the hardware processor of the second storage apparatus is configured to read third data from the first logical volume and send the third data to the host upon receiving a read command to the single volume sent from the host.

5. The information storage system according to claim 1, wherein, when the information obtained from the quorum indicates a normal state of the first storage apparatus, the hardware processor of the second storage apparatus is configured to block the second logical volume from the host, and
wherein the hardware processor of the first storage apparatus is configured to send data read from the first logical volume for a read command sent from the host, and write data to the first logical volume for a write command sent from the host without communication with the second storage apparatus.

6. The information storage system according to claim 1, wherein, when the information obtained from the quorum indicates a failure state of the first storage apparatus, the hardware processor of the second storage apparatus is configured to send data read from the first logical volume for a read command sent from the host, and write data to the first logical volume for a write command sent from the host without communication with the first storage apparatus.

7. A control method for an information storage system including a first storage apparatus that includes a storage device and a hardware processor operatively coupled with the storage device configured to provide a first logical volume, a second storage apparatus that includes a storage device and a hardware processor operatively coupled with the storage device configured to provide a second logical volume, and a quorum accessed from the first storage apparatus and the second storage apparatus and including information regarding states of the first storage apparatus and the second storage apparatus, the hardware processor of the first storage apparatus and the hardware processor of the second storage apparatus being configured to make a host recognize the first logical volume in the storage device of the first storage apparatus and the second logical volume in the storage device of the second storage apparatus as a single volume, the control method comprising:
reading, by the hardware processor of the first storage apparatus, first data from the first logical volume and sending the first data to the host upon receiving a read command to the single volume sent from the host;
reading, by the hardware processor of the second storage apparatus, second data from the second logical volume and sending the second data to the host upon receiving a read command to the single volume sent from the host;
upon receiving a write command to the single volume sent from the host, writing, by the hardware processor of the first storage apparatus, data to the first logical volume and the second logical volume;
upon receiving a write command to the single volume sent from the host, writing, by the hardware processor of the second storage apparatus, data to the first logical volume and the second logical volume; and
after detecting communication failure with the quorum, halting, by the hardware processor of the first storage apparatus and the hardware processor of the second storage apparatus, use of the quorum and changing a state from Pair state to RC-pair state,
upon receiving a write command to the single volume sent from the host, writing, by the hardware processor of the first storage apparatus, data to the first logical volume and the second logical volume in the RC-pair state,
after detecting communication failure between the first storage apparatus and the second storage apparatus in the Pair state, continuing, by either the hardware processor of the first storage apparatus or the hardware processor of the second storage apparatus, I/O processing according to the information in the quorum, and
after detecting communication failure between the first storage apparatus and the second storage apparatus in the RC-Pair state, continuing, by the hardware processor of the first storage apparatus, I/O processing if possible, and the hardware processor of the second storage apparatus is configured to halt I/O processing.

* * * * *